US011674812B2

(12) United States Patent
Omari et al.

(10) Patent No.: US 11,674,812 B2
(45) Date of Patent: Jun. 13, 2023

(54) APPROACHES FOR MAPPING GEOGRAPHIC REGIONS

(71) Applicant: Lyft, Inc., San Francisco, CA (US)

(72) Inventors: Sammy Omari, Menlo Park, CA (US); Joseph Patrick Wendell Whinnery, Scotts Valley, CA (US); Alfred Charles Jones, II, San Jose, CA (US)

(73) Assignee: Lyft, Inc., San Francisco, CA (US)

( * ) Notice: Subject to any disclaimer, the term of this patent is extended or adjusted under 35 U.S.C. 154(b) by 832 days.

(21) Appl. No.: 16/428,751

(22) Filed: May 31, 2019

(65) Prior Publication Data

US 2020/0378776 A1    Dec. 3, 2020

(51) Int. Cl.
*G01C 21/34* (2006.01)
*G05D 1/02* (2020.01)
*G01C 21/00* (2006.01)
*G01S 15/89* (2006.01)

(52) U.S. Cl.
CPC ..... *G01C 21/3453* (2013.01); *G01C 21/3822* (2020.08); *G05D 1/0221* (2013.01); *G01S 15/89* (2013.01); *G05D 1/0227* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,335,766 B1* | 5/2016 | Silver | | G01S 17/04 |
| 9,632,502 B1* | 4/2017 | Levinson | | H04L 41/0816 |
| 2014/0257621 A1* | 9/2014 | Zych | | G01C 21/20 |
| | | | | 701/410 |
| 2017/0132334 A1* | 5/2017 | Levinson | | G01S 17/931 |
| 2018/0267540 A1* | 9/2018 | Sonoura | | G05D 1/0221 |
| 2019/0344783 A1* | 11/2019 | Bertollini | | B60W 60/0013 |
| 2020/0081134 A1* | 3/2020 | Wheeler | | G01S 19/393 |
| 2020/0103902 A1* | 4/2020 | Dominic | | G01C 21/3822 |
| 2020/0166939 A1* | 5/2020 | Urano | | B60W 60/00253 |
| 2020/0255026 A1* | 8/2020 | Katardjiev | | B60W 40/12 |

(Continued)

OTHER PUBLICATIONS

"Road Condition and Road Roughness Assessment By Tire/Road Interaction Using Microphone, Dynamic Tire Pressure Sensor With an Axle", Zhao, Yubo, Northeastern University, Sep. 2015 (Year: 2015).*

(Continued)

*Primary Examiner* — Anne Marie Antonucci
*Assistant Examiner* — Amelia Vorce
(74) *Attorney, Agent, or Firm* — Sheppard Mullin Richter & Hampton LLP

(57) ABSTRACT

Systems, methods, and non-transitory computer-readable media can determine at least one potential route for navigating a vehicle within a geographic region. A score that measures a comfort level associated with the potential route can be determined, wherein the score is determined based on at least one sensor map that segments the geographic region into a grid of cells, and wherein the comfort level for the potential route is determined based at least in part on cells through which the vehicle travels while navigating along the potential route. A determination is made whether to use the potential route for navigating the vehicle based at least in part on the score.

20 Claims, 20 Drawing Sheets

(56) References Cited

U.S. PATENT DOCUMENTS

2020/0379108 A1\* 12/2020 Vijayalingam ....... G01S 15/931
2021/0141381 A1\* 5/2021 Maeda ................. G01C 21/206

OTHER PUBLICATIONS

"RoadSense: Smartphone Application to Estimate Road Conditions Using Accelerometer and Gyroscope", Allouch, Azza et al., IEEE Sensors Journal, vol. 17, No. 13, Jul. 1, 2017 (Year: 2017).\*

"A Novel Method for Real Time Pothole Detection System using Smartphones with Accelerometers", Maharjan, Sujit, Tribhuvan University, Apr. 2017 (Year: 2017).\*

\* cited by examiner

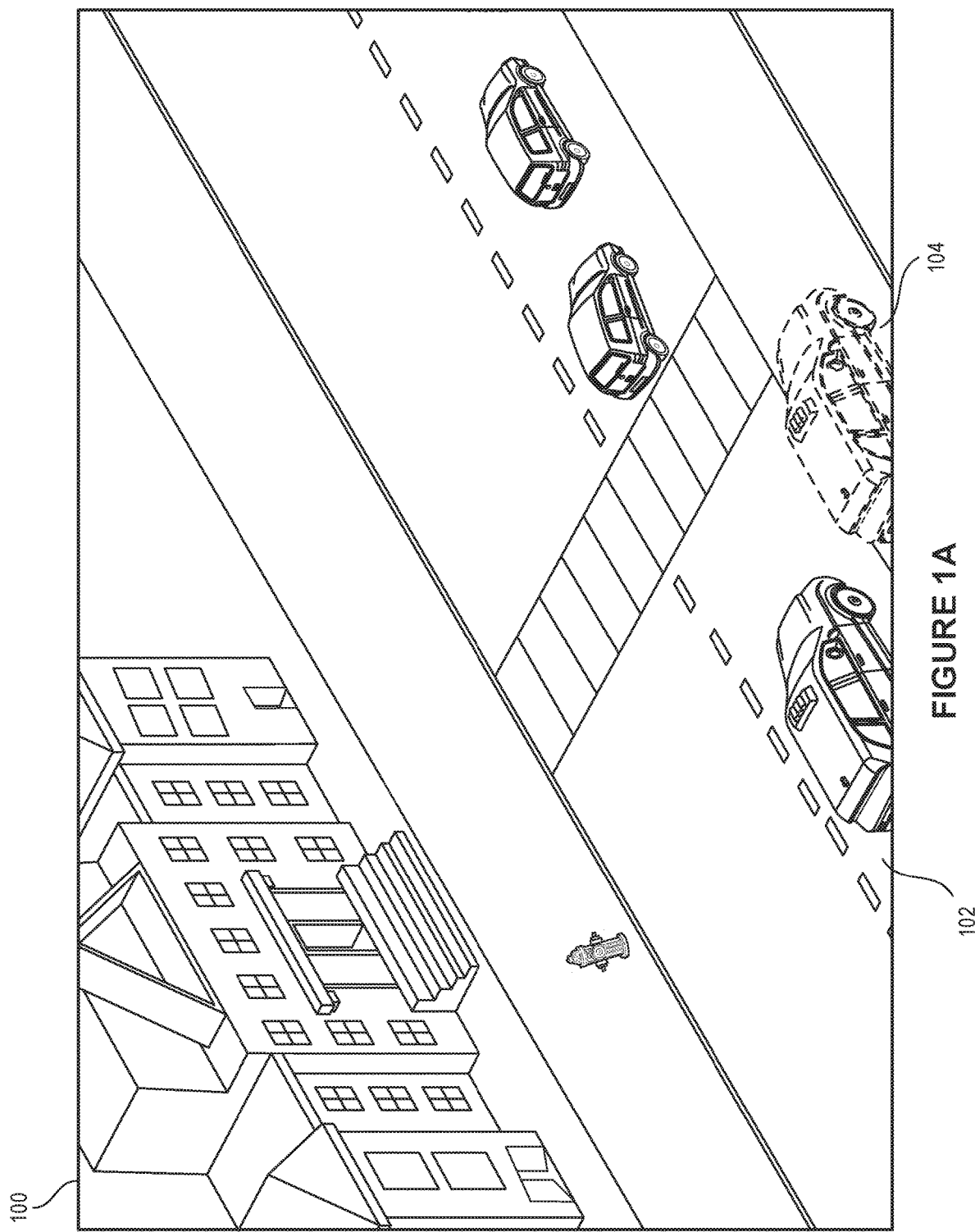

Acoustic Map Module 302

| Acoustic Data Module 304 | Map Grid Module 306 | Fingerprinting Module 308 |

FIGURE 3A

Vehicle Routing Module 342

- Route Module 344
- Sensor Map Module 346
- Scoring Module 348

Determine sensor data collected by a fleet of vehicles while navigating a geographic region
522

Determine a sensor map representing the geographic region, wherein the map segments the geographic region into a grid of cell, wherein regions of the geographic region that correspond to drivable surfaces are segmented at a greater level of granularity than regions that correspond to non-drivable surfaces
524

Associate instances of the collected sensor data with cells in the grid of cells
526

Determine a corresponding fingerprint for one or more cells in the grid of cells based at least in part on a plurality of instances of sensor data associated with the cell
528

FIGURE 5B

530 

```
┌─────────────────────────────────────────────────┐
│ Determine at least one potential route for      │
│ navigating a vehicle within a geographic region │
│                      532                        │
└─────────────────────────────────────────────────┘
                         │
                         ▼
┌─────────────────────────────────────────────────┐
│ Determine a score that measures a comfort level │
│ associated with the potential route, wherein    │
│ the score is determined based on at least one   │
│ sensor map that segments the geographic region  │
│ into a grid of cells, and wherein the comfort   │
│ level for the potential route is determined     │
│ based at least in part on cells through which   │
│ the vehicle travels while navigating along the  │
│ potential route                                 │
│                      534                        │
└─────────────────────────────────────────────────┘
                         │
                         ▼
┌─────────────────────────────────────────────────┐
│ Determine whether to use the potential route    │
│ for navigating the vehicle based at least in    │
│ part on the score                               │
│                      536                        │
└─────────────────────────────────────────────────┘
```

FIGURE 5C

APPROACHES FOR MAPPING GEOGRAPHIC REGIONS

FIELD OF THE INVENTION

The present technology relates to the field of vehicles. More particularly, the present technology relates to systems, apparatus, and methods for generating sensor maps of geographic regions and managing a fleet of vehicles based on the sensor maps.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, a vehicle may have optical cameras that can recognize hazards, roads, lane markings, traffic signals, and the like. Data from sensors may be used to, for example, safely drive the vehicle, activate certain safety features (e.g., automatic braking), and generate alerts about potential hazards.

SUMMARY

Various embodiments of the present technology can include systems, methods, and non-transitory computer readable media configured to determine at least one potential route for navigating a vehicle within a geographic region. A score that measures a comfort level associated with the potential route can be determined, wherein the score is determined based on at least one sensor map that segments the geographic region into a grid of cells, and wherein the comfort level for the potential route is determined based at least in part on cells through which the vehicle travels while navigating along the potential route. A determination is made whether to use the potential route for navigating the vehicle based at least in part on the score.

In an embodiment, the at least one sensor map is an acoustic map of the geographic region that measures acoustic properties associated with the geographic region, wherein the acoustic map segments the geographic region based on a grid of cells.

In an embodiment, determining the score further includes determining a set of cells in the acoustic map that represent the potential route; determining respective acoustic fingerprints for the set of cells; and determining the score measuring the comfort level for the potential route based at least in part on acoustic properties reflected in the acoustic fingerprints.

In an embodiment, the score is determined based at least in part on a machine learning model that is trained to score routes based on acoustic properties.

In an embodiment, the systems, methods, and non-transitory computer readable media are further configured to provide an acoustic fingerprint corresponding to a first cell in the set of cells to the machine learning model and obtain a score measuring a comfort level associated with a portion of the geographic region that is represented by the first cell.

In an embodiment, the machine learning model is trained to recognize at least one of: a speed bump, an unpaved section, a pothole, debris, a bumpy road segment, a stop sign, a traffic control device, designated crosswalks, and textured crosswalks.

In an embodiment, the at least one sensor map is an acceleration map of the geographic region that measures accelerative properties associated with the geographic region, wherein the acceleration map segments the geographic region based on a grid of cells.

In an embodiment, the systems, methods, and non-transitory computer readable media are further configured to determine a set of cells in the acceleration map that represent the potential route; determine respective acceleration fingerprints for the set of cells; and determine the score measuring the comfort level for the potential route based at least in part on accelerative properties reflected in the acceleration fingerprints.

In an embodiment, the score is determined based at least in part on a machine learning model that is trained to score routes based on accelerative properties.

In an embodiment, the systems, methods, and non-transitory computer readable media are further configured to determine a respective score that measures a comfort level associated with a first lane and a second lane in the potential route, wherein the score is determined based on the at least one sensor map of the geographic region; and determine whether to avoid the first lane or the second lane based at least in part on the scores.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIGS. 1A-1B illustrate various challenges that may be experienced when managing a fleet of vehicles, according to an embodiment of the present technology.

FIG. 3A illustrates an example acoustic map module, according to an embodiment of the present technology.

FIG. 3E illustrates an example vehicle routing module, according to an embodiment of the present technology.

FIGS. 5A-5C illustrate example methods, according to embodiments of the present technology.

Figure 1B:
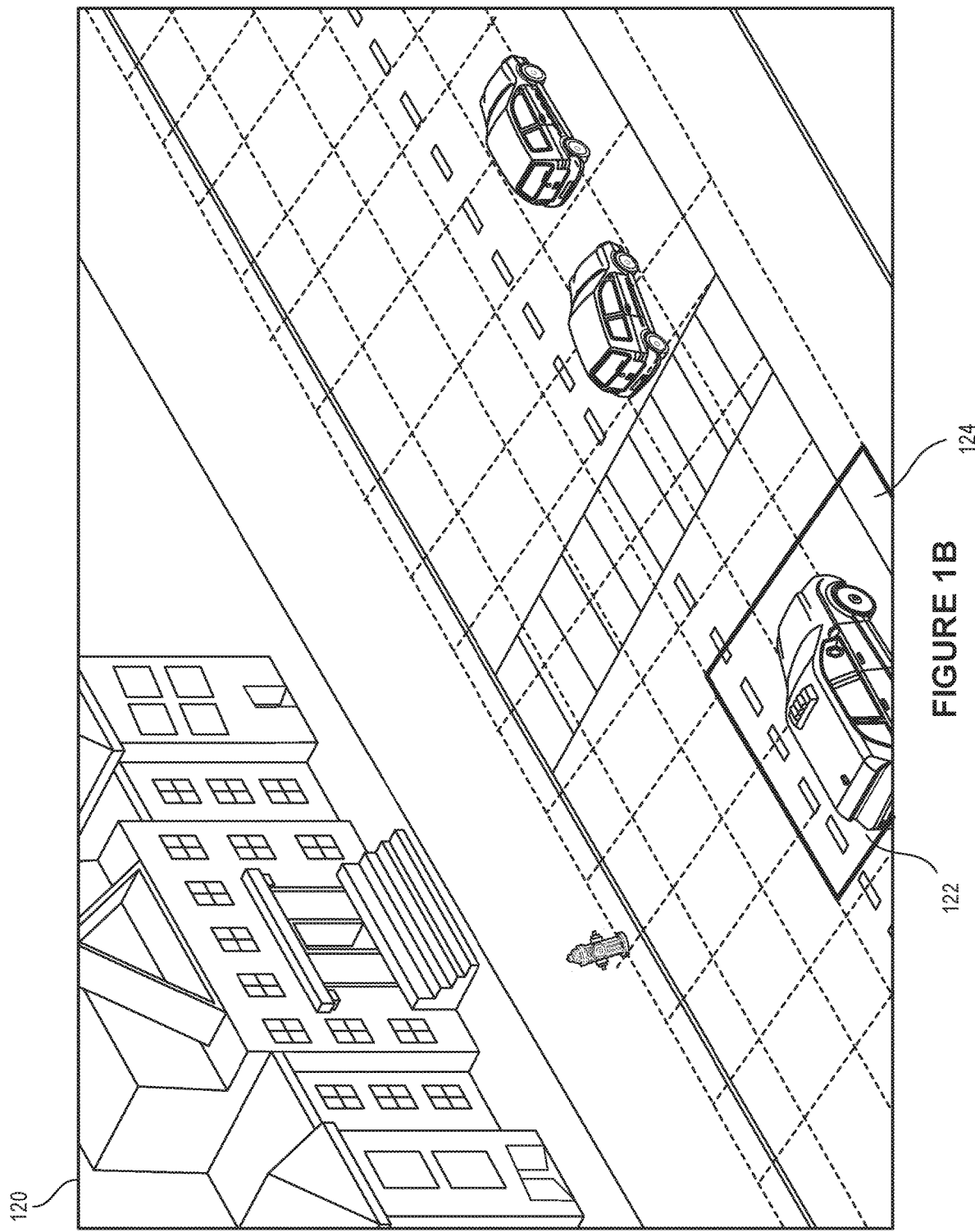

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. The vehicle may include a variety of systems and subsystems for enabling the vehicle to determine its surroundings so that it may safely navigate to target destinations or assist a human driver, if one is present, with doing the same. As one example, the vehicle may have a computing system for controlling various operations of the vehicle, such as driving and navigating. To that end, the computing system may process data from one or more sensors. For example, a vehicle may have optical cameras for recognizing hazards, roads, lane markings, traffic signals, and the like. Data from sensors may be used to, for example, safely drive the vehicle, activate certain safety features (e.g., automatic braking), and generate alerts about potential hazards.

Vehicles typically need to be able to localize themselves to navigate an environment. Conventional localization techniques can apply Simultaneous Localization And Mapping (SLAM). Such conventional approaches typically involve estimating positions of a vehicle based on GPS information, inertial measurement unit data, vehicle speed, and positions of landmarks, for example. However, vehicle localization using conventional approaches can be imprecise or lack robustness. For example, vehicle localization using conventional approaches can result in an incorrect estimation of the vehicle's position within an environment. Such errors can result in poor navigation and can expose vehicles to various risks. Conventional approaches pose disadvantages in addressing these and other problems. For example, FIG. 1A illustrates various challenges that may be experienced when localizing vehicles. FIG. 1A illustrates an example environment 100 being navigated by a vehicle 102. While navigating, the vehicle 102 can continually attempt to localize itself within the environment 100. As mentioned, conventional approaches for localizing the vehicle 102 can estimate positions of the vehicle 102 within the environment 100. However, such estimations may not localize the vehicle 102 with an acceptable level of accuracy. For example, conventional approaches may determine an incorrect location 104 for the vehicle 102. This lack of accuracy can result in faulty navigation and can expose the vehicle to various risks.

Figure 6:
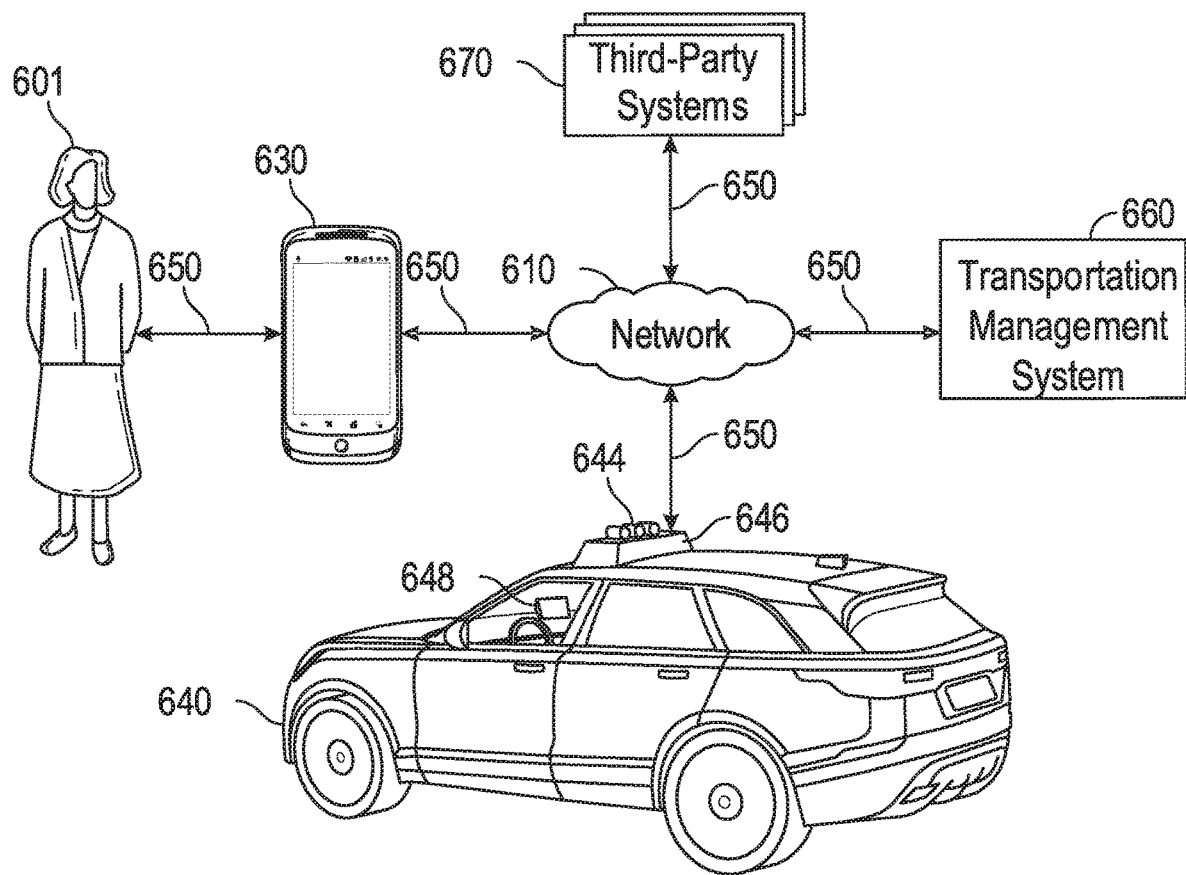
FIG. 6 illustrates an example block diagram of a transportation management environment, according to an embodiment of the present technology.

An improved approach in accordance with the present technology overcomes the foregoing and other disadvantages associated with conventional approaches. The improved approach can increase localization accuracy and robustness using sensor maps of geographic regions. For example, FIG. 1B illustrates an example environment 120 in which a vehicle 122 is navigating a road in accordance with the present technology. The vehicle 122 can be, for example, a vehicle 640 as shown in FIG. 6. The vehicle 122 includes a sensor suite that can be used to sense static (or stationary) objects, dynamic objects (e.g., objects in motion), and semi-permanent (or ephemeral) objects that are around (or within some threshold proximity of) the vehicle 122. The vehicle 122 can also include audio sensors (e.g., microphones) for sensing sound and acceleration sensors (e.g., accelerometers) for sensing vehicle acceleration. In the example of FIG. 1B, the environment 120 has been segmented into a grid of cells. In various embodiments, cells can be associated with one or more sensor fingerprints. In some embodiments, the environment 120 can be segmented so that grid cells are only associated with drivable surfaces (e.g., roads, dirt roads, parking lots, etc.). In some embodiments, the environment 120 can be segmented differently depending on the type of surface. For example, fewer cells can be associated with non-drivable surfaces (e.g., grass, houses, sidewalks, etc.) thereby reducing an amount of acoustic or acceleration resolution for such surfaces. Similarly, more cells can be associated with drivable surfaces thereby increasing an amount of acoustic or acceleration resolution for such surfaces. For example, a cell can be associated with an acoustic fingerprint that captures acoustic properties of some portion (or sub-region) of the environment 120 that is represented by the cell. For example, a region represented by a cell may include an unpaved road. In this example, an acoustic fingerprint associated with the cell can capture acoustic properties of the unpaved road relative to a vehicle (or one or more tires of the vehicle) driving on the unpaved road. In another example, a region represented by a cell may include a speed bump. In this example, an acoustic fingerprint associated with the cell can capture acoustic properties of the speed bump relative to a vehicle (or one or more tires of the vehicle) driving over the speed bump. In some embodiments, these acoustic properties can be correlated with acoustic measurements made by the vehicle 122 to localize the vehicle within the environment 120. For example, a threshold correlation can be determined between an acoustic measurement captured by the vehicle 122 and an acoustic fingerprint associated with a cell 124. As a result, the vehicle 122 can be localized to some region within the cell 124 with greater accuracy than conventional approaches. In other embodiments, cells can be associated with acceleration fingerprints that capture accelerative properties of the environment 120. These acceleration fingerprints can be used to localize the vehicle 122 based on acceleration measurements captured by the vehicle 122. Acoustic maps based on acoustic fingerprints and acceleration maps based on acceleration fingerprints can be used by themselves to accurately localize vehicles, or can be used in combination with other techniques (e.g., optical or visual localization techniques) to enhance localization determinations. In some embodiments, acoustic maps and acceleration maps can be used in combination at the same time to localize vehicles or to perform any of the other operations described herein. For example, in such embodiments, acoustic and acceleration measurements made by a vehicle can be used to localize the vehicle within some region by correlating the acoustic measurements to one or more cells of an acoustic map of the region and the acceleration measurements to one or more cells of an acceleration map of the region. The disclosed technology can be applied to all types of vehicles to perform localization and routing functionality, including scooters, bicycles, and motorcycles, for example. More details relating to the present technology are provided below.

Figure 2:
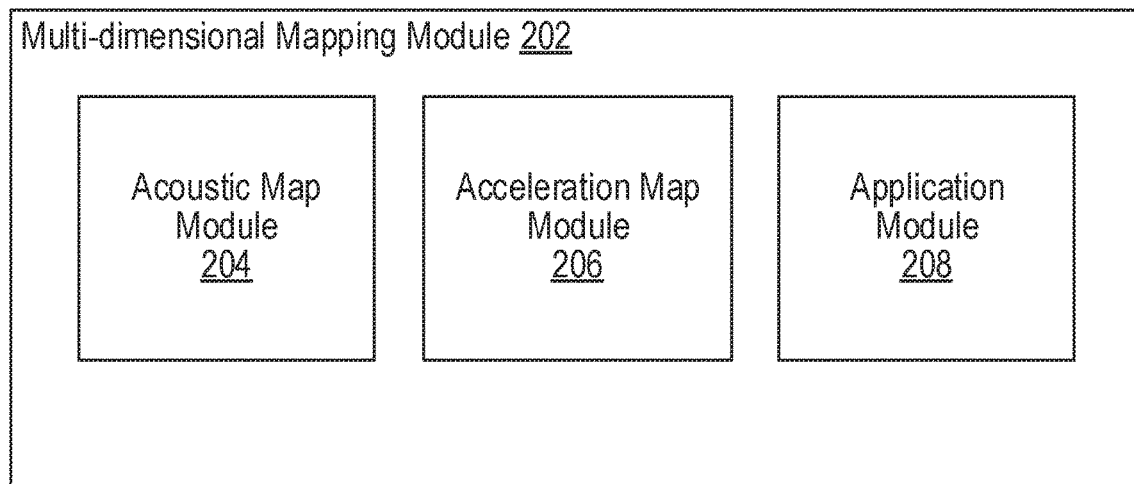
FIG. 2 illustrates an example multi-dimensional mapping module, according to an embodiment of the present technology.
Figure 2:
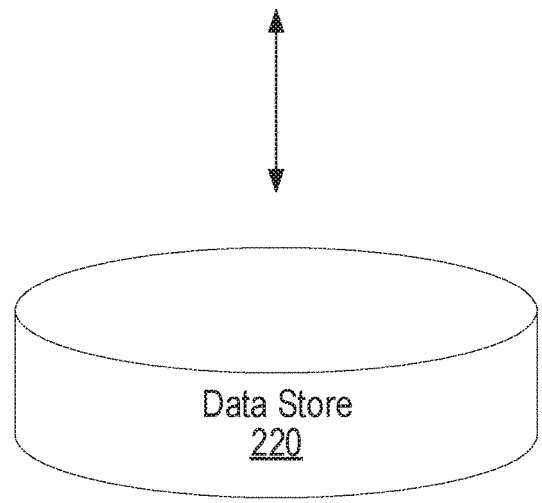

FIG. 2 illustrates an example system 200 including an example multi-dimensional mapping module 202, according to an embodiment of the present technology. As shown in the example of FIG. 2, the multi-dimensional mapping module 202 can include an acoustic map module 204, an acceleration map module 206, and an application module 208. In some instances, the example system 200 can include at least one data store 220. The multi-dimensional mapping module 202 can be configured to communicate and operate with the at least one data store 220. The at least one data store 220 can be configured to store and maintain various types of data. For example, the data store 220 can store information describing sensor data collected by a fleet of vehicles and corresponding geolocation data. In some embodiments, some or all of the functionality performed by the multi-dimensional mapping module 202 and its sub-modules may be performed by one or more backend computing systems, such as a transportation management system 660 of FIG. 6. In some embodiments, some or all of the functionality performed by the multi-dimensional mapping module 202 and its sub-modules may be performed by one or more computing systems implemented in a vehicle, such as a vehicle 640 of FIG. 6. In some embodiments, some or all data stored in the data store 220 can be stored by the transportation management system 660 of FIG. 6. In some embodiments, some or all data stored in the data store 220 can be stored by the vehicle 640 of FIG. 6. The components (e.g., modules, elements, etc.) shown in this figure and all figures herein are exemplary only, and other implementations may include additional, fewer, integrated, or different components. Some components may not be shown so as not to obscure relevant details.

The acoustic map module 204 can be configured to generate acoustic maps for geographic regions. For example, in various embodiments, sensor data collected by a fleet of vehicles (e.g., manually driven, semi-autonomous, or autonomous vehicles) can be used to generate acoustic maps for geographic regions. In some embodiments, an acoustic map of a geographic region can be determined based on acoustic data that is captured by audio sensors (e.g., microphones) of or associated with a fleet of vehicles while navigating the geographic region. In some embodiments, sensors of a vehicle measure airborne and structurally conducted noise transfer paths. More details regarding the acoustic map module 204 will be provided below with reference to FIG. 3A.

The acceleration map module 206 can be configured to generate acceleration maps for geographic regions. For example, in various embodiments, sensor data collected by a fleet of vehicles (e.g., manually driven, semi-autonomous, or autonomous vehicles) can be used to generate acceleration maps for geographic regions. In some embodiments, an acceleration map of a geographic region can be determined based on acceleration data that is captured by acceleration sensors (e.g., accelerometers) of or associated with a fleet of vehicles while navigating the geographic region. More details regarding the acceleration map module 206 will be provided below with reference to FIG. 3B.

The application module 208 can be configured to utilize acoustic maps and acceleration maps of geographic regions for various applications. For example, in some embodiments, a vehicle can be configured to localize itself within a geographic region based on an acoustic map of the geographic region, an acceleration map of the geographic region, or a combination thereof. More details regarding the application module 208 will be provided below with reference to FIG. 3C.

FIG. 3A illustrates an example acoustic map module 302, according to an embodiment of the present technology. In some embodiments, the acoustic map module 204 of FIG. 2 can be implemented with the acoustic map module 302. The acoustic map module 302 can be configured to generate acoustic maps for geographic regions. For example, the acoustic map module 302 can generate an acoustic map for a geographic region based on acoustic data captured by audio sensors (e.g., microphones) of autonomous, semi-autonomous, or manually driven vehicles. The vehicles from which the acoustic data is obtained may be included in a fleet of vehicles. In some embodiments, the fleet of vehicles may offer ridesharing services. As shown in the example of FIG. 3A, the acoustic map module 302 can include an acoustic data module 304, a map grid module 306, and a fingerprinting module 308.

The acoustic data module 304 can be configured to access acoustic data captured by vehicles while navigating various geographic regions. For example, acoustic data may be captured by one or more audio sensors of a vehicle that are capable of recording sound (e.g., microphones). The acoustic data module 304 can obtain such acoustic data, for example, from the data store 220 or directly from audio sensors associated with a vehicle in real-time (or near real-time). In some embodiments, the acoustic data module 304 can determine contextual information for acoustic data, such as a respective calendar date, day of week, and time of day during which the acoustic data was captured. Such contextual information may be obtained from an internal clock of a sensor or a computing device, one or more external computing systems (e.g., Network Time Protocol (NTP) servers), or GPS data, to name some examples. In some embodiments, the acoustic data module 304 can associate location data (e.g., geolocation information) with acoustic data. For example, geolocation information associated with acoustic data can be used to determine a geographic location from which the acoustic data was captured. In some embodiments, acoustic data captured by an audio sensor can be represented as a histogram that measures sound pressure level over various frequencies. In some embodiments, acoustic data captured by a vehicle at a geographic location can be layered. For example, a vehicle may include a first audio sensor positioned near a front left wheel and a second audio sensor positioned near a front right wheel. The first audio sensor and the second audio sensor can be used to capture separate instances of acoustic data while the vehicle navigates a geographic location. In this example, acoustic data captured by the first audio sensor corresponds to a first layer of acoustic data while acoustic data captured by the second audio sensor corresponds to a second layer of acoustic data. Naturally, the number of layers can increase as the number of audio sensors used to capture the acoustic data increases.

The map grid module 306 can be configured to segment a geographic region for which an acoustic map is being generated. For example, in various embodiments, the map grid module 306 can obtain a map (e.g., a road map) of the geographic region. The map grid module 306 can then discretize the map into a grid of cells. Each cell in the grid can represent some portion of the geographic region. In some embodiments, the cells are uniform in size. In other embodiments, the cells can vary in size. For example, cell dimensions can be decreased in size so that many cells are needed to represent a location (e.g., a road) within a geographic region. In this example, the smaller sized cells allow for increased acoustical resolution for the location. In another example, cell dimensions can be increased in size so that fewer cells are needed to represent a location (e.g., a road) within a geographic region. In this example, the larger sized cells result in decreased acoustical resolution for the location. In some embodiments, the map grid module 306 can associate cells with corresponding acoustic data. For example, the map grid module 306 can determine instances of acoustic data that were captured by audio sensors of the fleet of vehicles while navigating a portion (or sub-region) of a geographic region. Each instance of acoustic data can be captured by sensors when one or more tires of a vehicle interact with a physical surface (or sub-region) that has distinct and identifiable acoustic properties (e.g., a paved road, unpaved road, speed bump, reflectors, paint stripes, cobblestones, features of interest, etc.). The sensor readings produced when such interactions occur can reflect such distinct and identifiable acoustic properties. Some example sources of acoustic energy/waves include roads, tires, wind, engine, fan, motor, and pump. In this example, the map grid module 306 can associate the instances of acoustic data with a cell that represents the portion of the geographic region from which the acoustic data was captured. In some embodiments, each instance of acoustic data may be captured by an individual audio sensor of a vehicle. In some embodiments, if a vehicle has multiple audio sensors, then each audio sensor can capture a separate layer of an instance of acoustic data. In general, instances of acoustic data associated with a given cell may be captured by many different audio sensors of many different vehicles. Further, the acoustic data may be captured by vehicles while driving under various conditions (e.g., traffic patterns, times of day, weather conditions, etc.). Thus, the instances of acoustic data associated with the cell can reflect a spectrum of acoustic properties (e.g., sound pressure levels, frequencies, etc.) detected by vehicles when navigating a geographic location represented by the cell.

The fingerprinting module 308 can be configured to determine acoustic fingerprints for cells that represent a geographic region. In various embodiments, an acoustic fingerprint for a cell can be determined based on instances of acoustic data that were associated with the cell by the map grid module 306. For example, in some embodiments, a machine learning model can be trained to determine the acoustic fingerprint for the cell based on shared acoustic properties between the instances of acoustic data associated with the cell. In some embodiments, an acoustic fingerprint for a cell can be represented as a histogram that measures sound pressure level over a set of frequencies. For example, each instance of acoustic data can be represented as a histogram that measures sound pressure level over various frequencies. In this example, the machine learning model can be trained to determine the acoustic fingerprint based on shared acoustic properties among histograms of the instances of acoustic data associated with the cell. Many variations are possible. An acoustic fingerprint for a cell therefore represents acoustic properties (e.g., sound pressure levels, frequencies, etc.) associated with a geographic location that is represented by the cell. In some embodiments, the fingerprinting module 308 can associate cells with multiple acoustic fingerprints. For example, a cell representing a geographic location may be associated with multiple layers of acoustic data with each layer having been captured by a different audio sensor of the fleet of vehicles. For example, each vehicle in the fleet may include a first audio sensor positioned near a front bumper and a second audio sensor positioned near a rear bumper. Here, acoustic data captured by the first audio sensor of the vehicles corresponds to a first layer of acoustic data associated with the cell. Similarly, acoustic data captured by the second audio sensor of the vehicles corresponds to a second layer of acoustic data associated with the cell. In this example, a first acoustic fingerprint for the cell can be determined based on the first layer of acoustic data associated with the cell. For example, the first acoustic fingerprint can be determined using a machine learning model, as described above. Similarly, a second acoustic fingerprint can be determined based on the second layer of acoustic data. Many variations are possible. For example, in some embodiments, rather than associating cells with multiple acoustic fingerprints, a separate acoustic map can be generated for each audio sensor of the fleet of vehicles. For example, a first acoustic map can be generated based on acoustic data captured by a first audio sensor positioned near a front left wheel of the fleet of vehicles, a second acoustic map can be generated based on acoustic data captured by a second audio sensor positioned near a front right wheel of the fleet of vehicles, a third acoustic map can be generated based on acoustic data captured by a third audio sensor positioned near a rear left wheel of the fleet of vehicles, and a fourth acoustic map can be generated based on acoustic data captured by a fourth audio sensor positioned near a rear right wheel of the fleet of vehicles. In this example, cells in the first acoustic map can be associated with fingerprints determined based on acoustic data captured by the first audio sensor, cells in the second acoustic map can be associated with fingerprints determined based on acoustic data captured by the second audio sensor, cells in the third acoustic map can be associated with fingerprints determined based on acoustic data captured by the third audio sensor, and cells in the fourth acoustic map can be associated with fingerprints determined based on acoustic data captured by the fourth audio sensor. In various embodiments, acoustic fingerprints associated with cells can be used for myriad applications. For example, in some embodiments, acoustic data captured by audio sensors of a vehicle when navigating a geographic region can be compared with acoustic fingerprints associated with cells representing the geographic region. In this example, a threshold level of correlation (or similarity) may be determined between an instance of acoustic data captured by the vehicle when navigating some portion (or sub-region) of the geographic region and an acoustic fingerprint of a cell that represents that portion of the geographic region. This correlation can help localize the vehicle within the geographic region with greater accuracy than conventional methods. More details regarding application of acoustic maps will be provided below with reference to FIG. 3C.

Figure 3B:
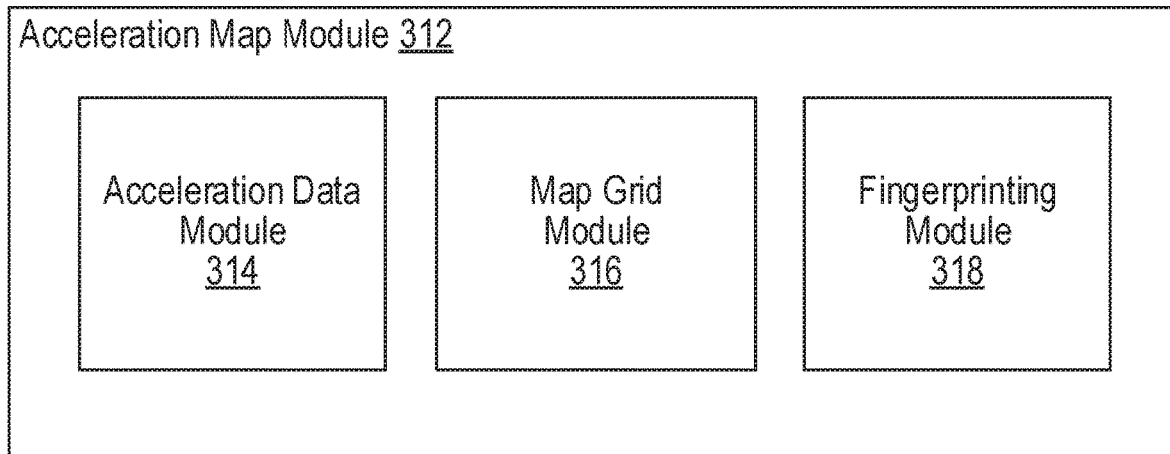
FIG. 3B illustrates an example acceleration map module, according to an embodiment of the present technology.

FIG. 3B illustrates an example acceleration map module 312, according to an embodiment of the present technology. In some embodiments, the acceleration map module 206 of FIG. 2 can be implemented with the acceleration map module 312. The acceleration map module 312 can be configured to generate acceleration maps for geographic regions. For example, the acceleration map module 312 can generate an acceleration map for a geographic region based on acceleration data captured by acceleration sensors (e.g., accelerometers) of autonomous, semi-autonomous, or manually driven vehicles. The vehicles from which the acceleration data is obtained may be included in a fleet of vehicles. In some embodiments, the fleet of vehicles may offer ridesharing services. As shown in the example of FIG. 3B, the acceleration map module 312 can include an acceleration data module 314, a map grid module 316, and a fingerprinting module 318.

The acceleration data module 314 can be configured to access acceleration data captured by vehicles while navigating various geographic regions. For example, acceleration data may be captured by one or more acceleration sensors of a vehicle that are capable of measuring acceleration (e.g., accelerometers). The acceleration data module 314 can obtain such acceleration data, for example, from the data store 220 or directly from acceleration sensors associated with a vehicle in real-time (or near real-time). In some embodiments, the acceleration data module 314 can determine contextual information for acceleration data such as a respective calendar date, day of week, and time of day during which the acceleration data was captured. Such contextual information may be obtained from an internal clock of a sensor or a computing device, one or more external computing systems (e.g., Network Time Protocol (NTP) servers), or GPS data, to name some examples. In some embodiments, the acceleration data module 314 can associate location data (e.g., geolocation information) with acceleration data. For example, geolocation information associated with acceleration data can be used to determine a geographic location from which the acceleration data was captured. In some embodiments, acceleration data captured by an acceleration sensor can be represented as a histogram that measures acceleration in meters per second squared over various frequencies. In some embodiments, acceleration data captured by a vehicle at a geographic location can be layered. For example, a vehicle may include a first acceleration sensor positioned near a front left wheel and a second acceleration sensor positioned near a front right wheel. The first acceleration sensor and the second acceleration sensor can be used to capture separate instances of acceleration data while the vehicle navigates a geographic location. In this example, acceleration data captured by the first acceleration sensor corresponds to a first layer of acceleration data while acceleration data captured by the second acceleration sensor corresponds to a second layer of acceleration data. Naturally, the number of layers can increase as the number of acceleration sensors used to capture the acceleration data increases.

The map grid module 316 can be configured to segment a geographic region for which an acceleration map is being generated. For example, in various embodiments, the map grid module 316 can obtain a map (e.g., a road map) of the geographic region. The map grid module 316 can then discretize the map into a grid of cells. Each cell in the grid can represent some portion of the geographic region. In some embodiments, the cells are uniform in size. In other embodiments, the cells can vary in size. For example, cell dimensions can be decreased in size so that many cells are needed to represent a location (e.g., a road) within a geographic region. In this example, the smaller sized cells allow for increased accelerative resolution for the location. In another example, cell dimensions can be increased in size so that fewer cells are needed to represent a location (e.g., a road) within a geographic region. In this example, the larger sized cells result in decreased accelerative resolution for the location. In some embodiments, the map grid module 316 can associate cells with corresponding acceleration data. For example, the map grid module 316 can determine instances of acceleration data that were captured by acceleration sensors of the fleet of vehicles while navigating a portion (or sub-region) of a geographic region. Each instance of acceleration data can be captured by sensors when one or more tires of a vehicle interact with a physical surface (or sub-region) that has distinct and identifiable acceleration properties (e.g., a paved road, unpaved road, speed bump, reflectors, paint stripes, cobblestones, features of interest, etc.). The sensor readings produced when such interactions occur can reflect such distinct and identifiable acceleration properties. For example, vertical disturbances resulting from tire and surface interactions can also produce accelerations/forces that are conducted through a given tire of a vehicle, to a corresponding wheel, and to an unsprung/sprung mass interaction of the vehicle suspension. The acceleration data can be captured based on the unsprung mass at each wheel and the sprung mass at the periphery of the vehicle body mass center. In this example, the map grid module 316 can associate the instances of acceleration data with a cell that represents the portion of the geographic region from which the acceleration data was captured. In some embodiments, each instance of acceleration data may be captured by an individual acceleration sensor of a vehicle. In some embodiments, if a vehicle has multiple acceleration sensors, then each acceleration sensor can capture a separate layer of an instance of acceleration data. In general, instances of acceleration data associated with a given cell may be captured by many different acceleration sensors of many different vehicles. Further, the acceleration data may be captured by vehicles while driving under various conditions (e.g., traffic patterns, times of day, weather conditions, etc.). Thus, the instances of acceleration data associated with the cell can reflect a spectrum of accelerative properties (e.g., speed, rate of change, etc.) detected by vehicles when navigating a geographic location represented by the cell.

The fingerprinting module 318 can be configured to determine acceleration fingerprints for cells that represent a geographic region. In various embodiments, an acceleration fingerprint for a cell can be determined based on instances of acceleration data that were associated with the cell by the map grid module 316. For example, in some embodiments, a machine learning model can be trained to determine the acceleration fingerprint for the cell based on shared accelerative properties between the instances of acceleration data associated with the cell. In some embodiments, an acceleration fingerprint for a cell can be represented as a histogram that measures acceleration in meters per second squared over various frequencies. For example, each instance of acceleration data can be represented as a histogram that measures acceleration in meters per second squared over various frequencies. In this example, the machine learning model can be trained to determine the acceleration fingerprint based on shared accelerative properties among histograms of the instances of acceleration data associated with the cell. Many variations are possible. An acceleration fingerprint for a cell therefore represents accelerative properties (e.g., speeds, rates of change, etc.) associated with a geographic location that is represented by the cell. In some embodiments, the fingerprinting module 318 can associate cells with multiple acceleration fingerprints. For example, a cell representing a geographic location may be associated with multiple layers of acceleration data with each layer having been captured by a different acceleration sensor of the fleet of vehicles. For example, each vehicle in the fleet may include a first acceleration sensor positioned near a front bumper and a second acceleration sensor positioned near a rear bumper. Here, acceleration data captured by the first acceleration sensor of the vehicles corresponds to a first layer of acceleration data associated with the cell. Similarly, acceleration data captured by the second acceleration sensor of the vehicles corresponds to a second layer of acceleration data associated with the cell. In this example, a first acceleration fingerprint for the cell can be determined based on the first layer of acceleration data associated with the cell. For example, the first acceleration fingerprint can be determined using a machine learning model, as described above. Similarly, a second acceleration fingerprint can be determined based on the second layer of acceleration data. Many variations are possible. For example, in some embodiments, rather than associating cells with multiple acceleration fingerprints, a separate acceleration map can be generated for each acceleration sensor of the fleet of vehicles. For example, a first acceleration map can be generated based on acceleration data captured by a first acceleration sensor positioned near a front left wheel of the fleet of vehicles, a second acceleration map can be generated based on acceleration data captured by a second acceleration sensor positioned near a front right wheel of the fleet of vehicles, a third acceleration map can be generated based on acceleration data captured by a third acceleration sensor positioned near a rear left wheel of the fleet of vehicles, and a fourth acceleration map can be generated based on acceleration data captured by a fourth acceleration sensor positioned near a rear right wheel of the fleet of vehicles. In this example, cells in the first acceleration map can be associated with fingerprints determined based on acceleration data captured by the first acceleration sensor, cells in the second acceleration map can be associated with fingerprints determined based on acceleration data captured by the second acceleration sensor, cells in the third acceleration map can be associated with fingerprints determined based on acceleration data captured by the third acceleration sensor, and cells in the fourth acceleration map can be associated with fingerprints determined based on acceleration data captured by the fourth acceleration sensor. In various embodiments, acceleration fingerprints associated with cells can be used for myriad applications. For example, in some embodiments, acceleration data captured by acceleration sensors of a vehicle when navigating a geographic region can be compared with acceleration fingerprints associated with cells representing the geographic region. In this example, a threshold level of correlation may be determined between an instance of acceleration data captured by the vehicle when navigating some portion (or sub-region) of the geographic region and an acceleration fingerprint of a cell that represents that portion of the geographic region. This correlation can help localize the vehicle within the geographic region with greater accuracy than conventional methods. More details regarding application of acceleration maps will be provided below with reference to FIG. 3C.

Figure 3C:
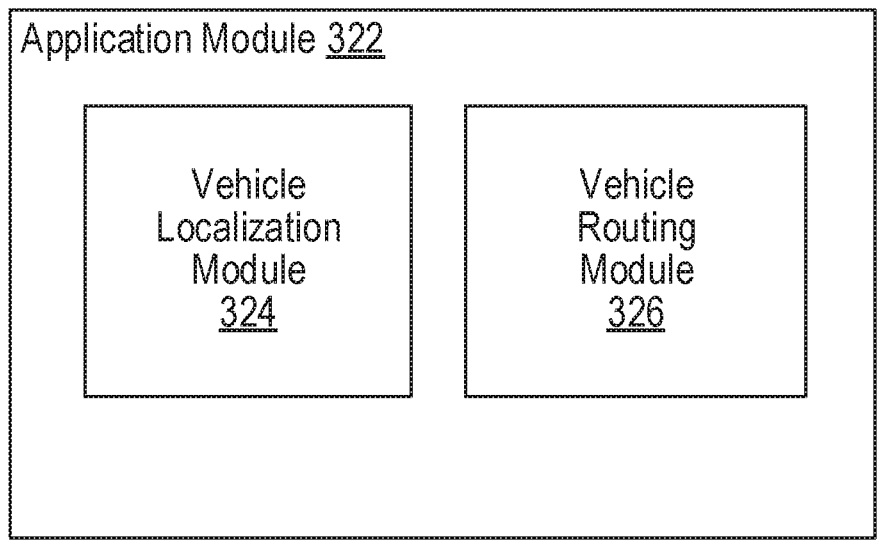
FIG. 3C illustrates an example application module, according to an embodiment of the present technology.

FIG. 3C illustrates an example application module 322, according to an embodiment of the present technology. In some embodiments, the application module 208 of FIG. 2 can be implemented with the application module 322. The application module 322 can be configured to utilize acoustic maps and acceleration maps generated for geographic regions for various applications. As shown in the example of FIG. 3C, the application module 322 can include a vehicle localization module 324 and a vehicle routing module 326.

The vehicle localization module 324 can be configured to localize a vehicle within a geographic region. For example, in some embodiments, the vehicle localization module 324 can localize a vehicle within a geographic region based on an acoustic map of the geographic region, an acceleration map of the geographic region, or a combination thereof. More details regarding the vehicle localization module 324 will be provided below with reference to FIG. 3D.

The vehicle routing module 326 can be configured to determine routes for navigating a vehicle through a geographic region based on comfort level. For example, in some embodiments, the vehicle routing module 326 can route a vehicle within a geographic region based on an acoustic map of the geographic region, an acceleration map of the geographic region, or a combination thereof. More details regarding the vehicle routing module 326 will be provided below with reference to FIG. 3E.

Figure 3D:
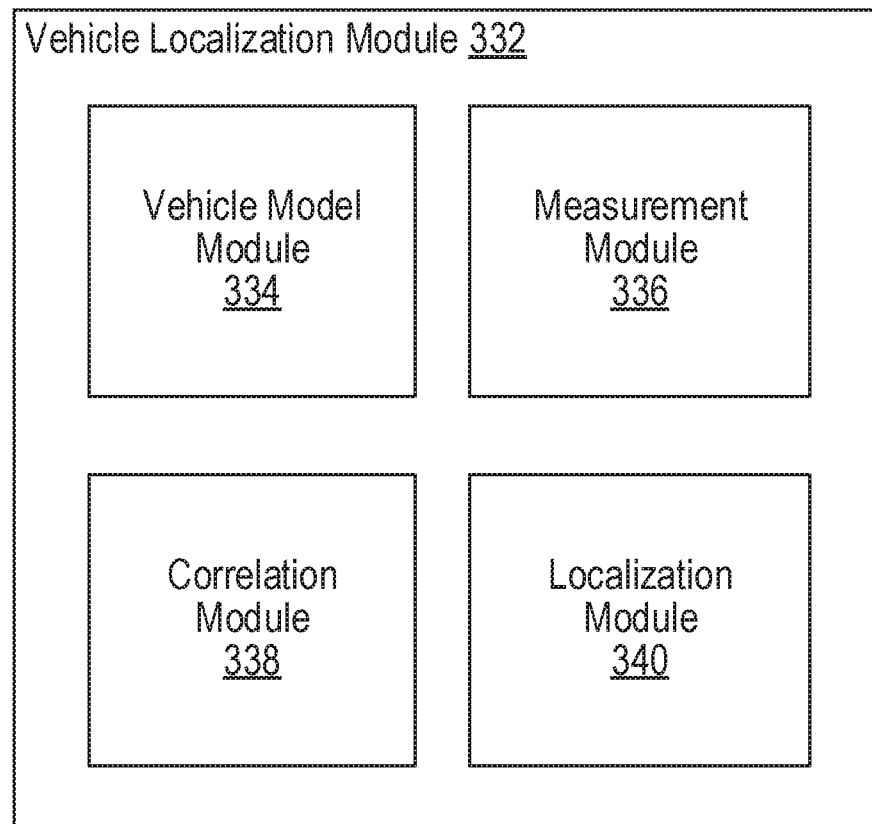
FIG. 3D illustrates an example vehicle localization module, according to an embodiment of the present technology.

FIG. 3D illustrates an example vehicle localization module 332, according to an embodiment of the present technology. In some embodiments, the vehicle localization module 324 of FIG. 3C can be implemented with the vehicle localization module 332. The vehicle localization module 332 can be configured to utilize sensor maps generated for geographic regions (e.g., acoustic maps, acceleration maps) to localize a vehicle. As shown in the example of FIG. 3D, the vehicle localization module 332 can include a vehicle model module 334, a measurement module 336, a correlation module 338, and a localization module 340.

The vehicle model module 334 can provide trajectory information for a vehicle. For example, at any given time interval, the vehicle model module 334 can determine vehicle information, such as a steering angle, direction, rate of change in the direction, wheel tick information, tire pressure, brake pressure, braking torque, throttle position, roll/pitch/yaw coordinates, roll/pitch/yaw rates of change, an amount of signal strength for accelerating over a feature versus respective braking pressure that loads up in each wheel of the vehicle as it rolls over the feature, road wheel angle, individual tire cornering force and slip, individual wheel braking torque and propulsive torque, a pose of the vehicle, a change in the pose of the vehicle in relation to a trajectory of the vehicle, and a comfort level of the vehicle motion as experienced by passengers of the vehicle. In some embodiments, wheel tick information includes tire rotational information for each wheel of the vehicle. The rotational information can be measure changes to the rotation of a wheel in terms of wheel ticks where each wheel tick represents a pre-defined rotational amount. In some embodiments, a pose of a vehicle influences how much yaw must occur in order for the vehicle path to pass over the edge of the next acoustic waypoint feature. In such instances where the vehicle passes over the edge of the waypoint feature, ride comfort is optimized while still providing hyper-localization using the signature response from the edge of the acoustic waypoint feature. For example, features encountered by a vehicle on a roadway can be used as targets for individual tire paths (trajectories). The more significant the feature (e.g., speed bump, bridge expansion joint, Botts Dot, pothole, manhole cover), the more pronounced the signature of the disturbance, which allows the vehicle to be localized with a higher confidence when a tire of the vehicle hits the feature. To promote ride comfort, the vehicle can be instructed to encounter the feature enough to detect its signature (e.g., acoustic signature, acceleration signature), while avoiding the disturbance and degradation in ride comfort that would occur from fully encountering the feature. Accordingly, by seeking to intentionally encounter only a portion of a feature in a cell, the vehicle can be localized while minimizing disturbance to ride comfort. Such vehicle information can be used to determine a trajectory (e.g., position, direction, speed, etc.) for the vehicle. For example, after determining an initial location of the vehicle, the vehicle model module 334 can determine vehicle information at pre-defined time intervals (e.g., every 100 milliseconds). Thus, at each time interval, the vehicle model module 334 determines updated vehicle information that can be used to trace the trajectory of the vehicle. In some embodiments, the vehicle information may be used as an input in the machine learning model and used to train the model to identify different signatures across different vehicles, vehicle states, speeds, etc.

The measurement module 336 can be configured to determine sensor measurements made by a vehicle at various time intervals. For example, in some embodiments, the measurement module 336 can determine an instance of acoustic data that was captured by one or more audio sensors of the vehicle. In some embodiments, the acoustic data can be represented as a histogram that measures sound pressure level over various frequencies. In some embodiments, the measurement module 336 can determine an instance of acceleration data that was captured by one or more acceleration sensors of a vehicle. In some embodiments, the acceleration data can be represented as a histogram that measures acceleration over various frequencies.

The correlation module 338 can be configured to determine an amount of correlation between sensor measurements made by a vehicle and sensor fingerprints (e.g., acoustic fingerprints, acceleration fingerprints) associated with a map of a geographic region (e.g., acoustic map, acceleration map). The map can be discretized into a grid of cells that collectively represent the geographic region. In various embodiments, an amount of correlation between a sensor measurement and a sensor fingerprint associated with a cell can be determined based on a machine learning model. For example, a machine learning model can receive an acoustic measurement made by one or more audio sensors of a vehicle and an acoustic fingerprint associated with a cell as inputs and can output a score that measures an amount of correlation between the acoustic measurement and the acoustic fingerprint. In another example, a machine learning model can receive an acceleration measurement made by one or more acceleration sensors of a vehicle and an acceleration fingerprint associated with a cell as inputs and can output a score that measures an amount of correlation between the acceleration measurement and the acceleration fingerprint. Many variations are possible.

The localization module 340 can localize a vehicle within a geographic region. In various embodiments, the localization module 340 can localize the vehicle based on correlations between sensor measurements (e.g., acoustic measurements, acceleration measurements) captured by the vehicle and respective sensor fingerprints associated with a grid of cells (e.g., acoustic fingerprints, acceleration fingerprints) representing the geographic region. For example, the localization module 340 can determine a score that measures an amount of correlation between a given sensor measurement (e.g., acoustic measurement, acceleration measurement) that was taken at some time interval and a respective sensor fingerprint associated with a cell representing the geographic region. In various embodiments, the score is also based on how closely the cell corresponds to a trajectory for the vehicle, as determined by the vehicle model module 334. Thus, the score is higher if a location of the cell more closely corresponds to the vehicle trajectory and lower if the location less closely corresponds to the vehicle trajectory. In such embodiments, a cell in the grid of cells with a highest score can be determined as a location within which some portion of the vehicle is present. In some embodiments, the localization module 340 can localize the vehicle based on particle filtering. For example, rather than determine a score for each cell in the grid, the localization module 340 can randomly initialize a set of uniformly weighted particles in various cells in the grid. A score measuring a correlation between a captured sensor measurement and a sensor fingerprint associated with a cell in which a particle is initialized can be determined for each of the particles, as described above. In some embodiments, a weight assigned to a particle increases when a threshold amount of correlation exists between a sensor measurement and a sensor fingerprint associated with a cell in which the particle was initialized. In such embodiments, the localization module 340 can discard one or more of the particles with low correlation scores and can re-initialize the remaining particles around one or more particles with the best correlation scores. In this example, the localization module 340 can iteratively discard and re-initialize particles until the particles converge within one or more cells. The one or more cells within which the particles converge can be identified as cells within which some portion of the vehicle is located. In some embodiments, to further improve localization, the localization module 340 also determines scores measuring correlations for particles that neighbor an initialized particle and applies bi-linear weighting based on vehicle position. As a result, localization of the vehicle can be continuous instead of being discrete. In some embodiments, one or more dedicated particles can be initialized for each sensor of a vehicle from which sensor measurements are captured. For example, the vehicle model module 334 can define a geometric relationship between sensors of the vehicle. For example, the geometric relationship may indicate that a sensor is positioned near each wheel of the vehicle. In such embodiments, the localization module 340 can ensure that the pre-defined geometric relationship is maintained between the dedicated particles as the vehicle is localized. For example, in some embodiments, dedicated particles can be initialized for each audio sensor of a vehicle. These dedicated particles can be used to localize the vehicle with respect to sensor measurements captured by the different audio sensors of the vehicle. In some embodiments, dedicated particles can be initialized for each acceleration sensor of a vehicle. These dedicated particles can be used to localize the vehicle with respect to sensor measurements captured by the different acceleration sensors of the vehicle. Many variations are possible.

FIG. 3E illustrates an example vehicle routing module 342, according to an embodiment of the present technology. In some embodiments, the vehicle routing module 326 of FIG. 3C can be implemented with the vehicle routing module 342. The vehicle routing module 342 can be configured to utilize sensor maps generated for geographic regions (e.g., acoustic maps, acceleration maps) to route a vehicle. As shown in the example of FIG. 3E, the vehicle routing module 342 can include a route module 344, a sensor map module 346, and a scoring module 348.

The route module 344 can obtain information describing a potential route that can be used by a vehicle when traveling to a destination. For example, such information may be obtained from a transportation management system, such as the transportation management system 660 of FIG. 6. In various embodiments, the potential route can be evaluated based on one or more sensor maps (e.g., acoustic maps, acceleration maps) of the geographic region. For example, the vehicle can transition to a different route if a determination is made that use of the potential route may cause discomfort for vehicle passengers. In another example, the vehicle can transition to a different route if a determination is made that use of the potential route may cause unsafe driving conditions.

The sensor map module 346 can obtain one or more sensors maps (e.g., acoustic maps, acceleration maps) for a geographic region that includes a potential route being evaluated. In various embodiments, a sensor map can segment the geographic region into a grid of cells. One or more of the cells can be associated with corresponding sensor fingerprints (e.g., acoustic fingerprints, acceleration fingerprints) that capture various properties of the geographic region. In some embodiments, the sensor map module 346 can determine a set of cells that represent a portion of the geographic region that includes the potential route being evaluated. The sensor map module 346 can also determine respective sensor fingerprints associated with the set of cells.

The scoring module 348 can be configured to score a potential route that can be used to route a vehicle. In some embodiments, when scoring a potential route, the scoring module 348 can evaluate one or more trajectories that can be taken by a vehicle while proceeding along the potential route. Each trajectory can represent a path traveled by the wheels of the vehicle. Thus, in addition to scoring a navigation route that identifies one or more lanes to be taken by the vehicle when traveling from a starting position to a destination, the scoring module 348 can also score various trajectories that can be taken by the wheels of the vehicle when traveling along the navigation route. In some embodiments, the scoring module 348 can score the potential route based on an amount of discomfort that is expected to be experienced by passengers when the vehicle is navigated using the route. In some embodiments, the potential route is scored based on acoustic properties associated with the route. For example, the scoring module 348 can obtain a set of cells that represent a portion of a geographic region that includes the potential route being evaluated and corresponding acoustic fingerprints for the cells, as provided by the sensor map module 346. In some embodiments, the scoring module 348 can provide these acoustic fingerprints as inputs to a machine learning model that outputs respective scores measuring an amount of discomfort associated with a given cell based on acoustic fingerprints associated with the cell. For example, the machine learning model can be trained using examples of sensor data captured by a fleet of vehicles. The examples can train the machine learning model to recognize road features that are typically associated with passenger discomfort or unsafe driving conditions, such as speed bumps, unpaved sections, potholes, debris, bumpy road segments, stop signs, and traffic control devices, to name some examples. In some embodiments, the scores outputted by the machine learning model for individual cells can be aggregated to determine an overall comfort score for the potential route. In some embodiments, the potential route can be avoided or deprioritized when the comfort score fails to satisfy a threshold score. For example, a destination may be reachable via a first route which includes a bumpy road and a second route which includes a paved road. In this example, a score for the second route is greater than a score for the first route because the second route includes the paved road. As a result, the scoring module 348 can prioritize use of the second route over the first route. The potential route can be evaluated using other types of sensor maps. For example, in some embodiments, the potential route can be scored based on accelerative properties associated with the route based on an acceleration map of the geographic region, as described above. In some embodiments, the scoring module 348 can score portions of a route, as described above. For example, a road to a destination may include a first lane which has potholes and a second lane which is a paved road. For example, the scoring module 348 can determine a score for the first lane based on sensor fingerprints associated with cells that represent the first lane. Similarly, the scoring module 348 can determine a score for the second lane based on sensor fingerprints associated with cells that represent the second lane. In this example, use of the second lane can be prioritized over use of the first lane to improve a comfort level for vehicle passengers. Many variations are possible. In some embodiments, the scoring module 348 can determine a trajectory that passes along a boundary between cells that would increase passenger discomfort and have a minimum level of measurable acoustic fingerprint so as to aid localization without increasing discomfort by navigating the vehicle through cells with the highest amplitude of acoustic fingerprint and having a high level of correlation.

Figure 4A:
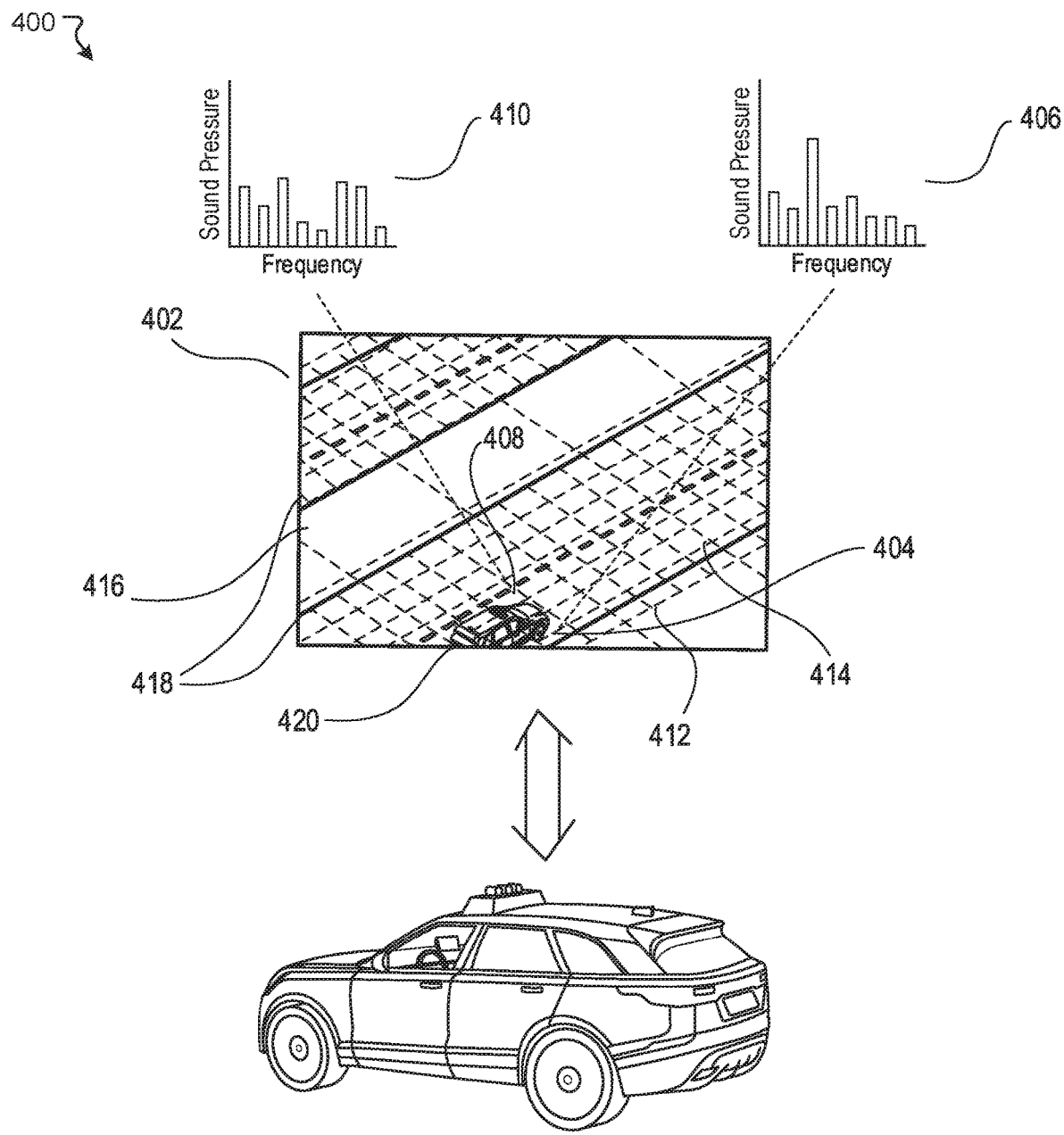
FIG. 4A illustrates an example diagram of an acoustic map, according to an embodiment of the present technology.

FIG. 4A illustrates an example diagram 400 of an acoustic map 402 generated based on functionality of the acoustic map module 302, according to an embodiment of the present technology. The acoustic map 402 can be generated for a geographic region based on acoustic data collected by a fleet of vehicles (e.g., the vehicle 640 as shown in FIG. 6) while navigating the geographic region. In the example shown, the geographic region includes two separated roads, with each road including two lanes separated by a lane divider 416. The acoustic map 402 can be discretized into a grid of cells. The cells are demarcated by grid lines, such as grid lines 412, 414. In various embodiments, a cell in the grid can be associated with one or more acoustic fingerprints. The acoustic fingerprints for the cell can be determined based on instances of acoustic data that were captured by the fleet of vehicles while navigating a geographic location represented by the cell. For example, in FIG. 4A, a cell 404 is associated with an acoustic fingerprint 406. Further, a cell 408 is associated with an acoustic fingerprint 410. For example, the acoustic fingerprints 406, 410 can be represented as histograms that reflect sound pressure level over various frequencies. The acoustic fingerprints 406, 410 can be determined based on sensor data collected by vehicles traveling through regions bounded by the cells 408, 410 respectively. In the example of FIG. 4A, a front-right wheel of a vehicle 420 is positioned within a boundary defined by the cell 404 and a front-left wheel of the vehicle 420 is positioned with a boundary defined by the cell 408. In some embodiments, sensor data collected by various audio sensors positioned in various locations of the vehicle 420 can be used to localize the vehicle 420. For example, sensor data received from a first sensor positioned on or near the front-right wheel of the vehicle 420 can be used to determine corresponding acoustic features based on a surface interaction of the front-right wheel and a road surface associated with the cell 404. Similarly, sensor data received from a second sensor positioned on or near the front-left wheel of the vehicle 420 can be used to determine corresponding acoustic features based on a surface interaction of the front-left wheel and a road surface associated with the cell 408. In some embodiments, the respective cell positions of the wheels of the vehicle 420 and their corresponding acoustic fingerprints can be used to localize the vehicle 420. In some embodiments, cells can be associated with multiple acoustic fingerprints. For example, a cell may be associated with multiple layers of acoustic data that were captured by different audio sensors of the fleet of vehicles. In this example, the cell can be associated with multiple acoustic fingerprints that each represent a layer of the acoustic data. In some embodiments, the acoustic map 402 can be segmented differently depending on the type of surface. For example, fewer cells can be associated with non-drivable surfaces, such as the lane divider 416, while more cells can be associated with drivable surfaces such as roads 418. Many variations are possible.

The acoustic and/or acceleration sensors may be located on the suspension of the vehicle at various points in order to ensure the received signals capture the force/signal that is generated by the interaction/friction of the tire and the road. For example, in some embodiments, a sensor can be placed on a suspension control arm (e.g., near wheel hub) to measure accelerations with higher amplitudes and higher frequency content. As a result, the sensor can have access to more information content than a sensor mounted on the body of the vehicle, since the suspension can filter, or remove, information contained in the higher frequencies, as well as reducing the magnitude, of accelerations experienced by the body. In some embodiments, sensors on the body that measure body motion can provide additional information about a signature of a road feature due to vehicle motion. For example, braking while going over a speed bump can make the signal much larger.

Figure 4B:
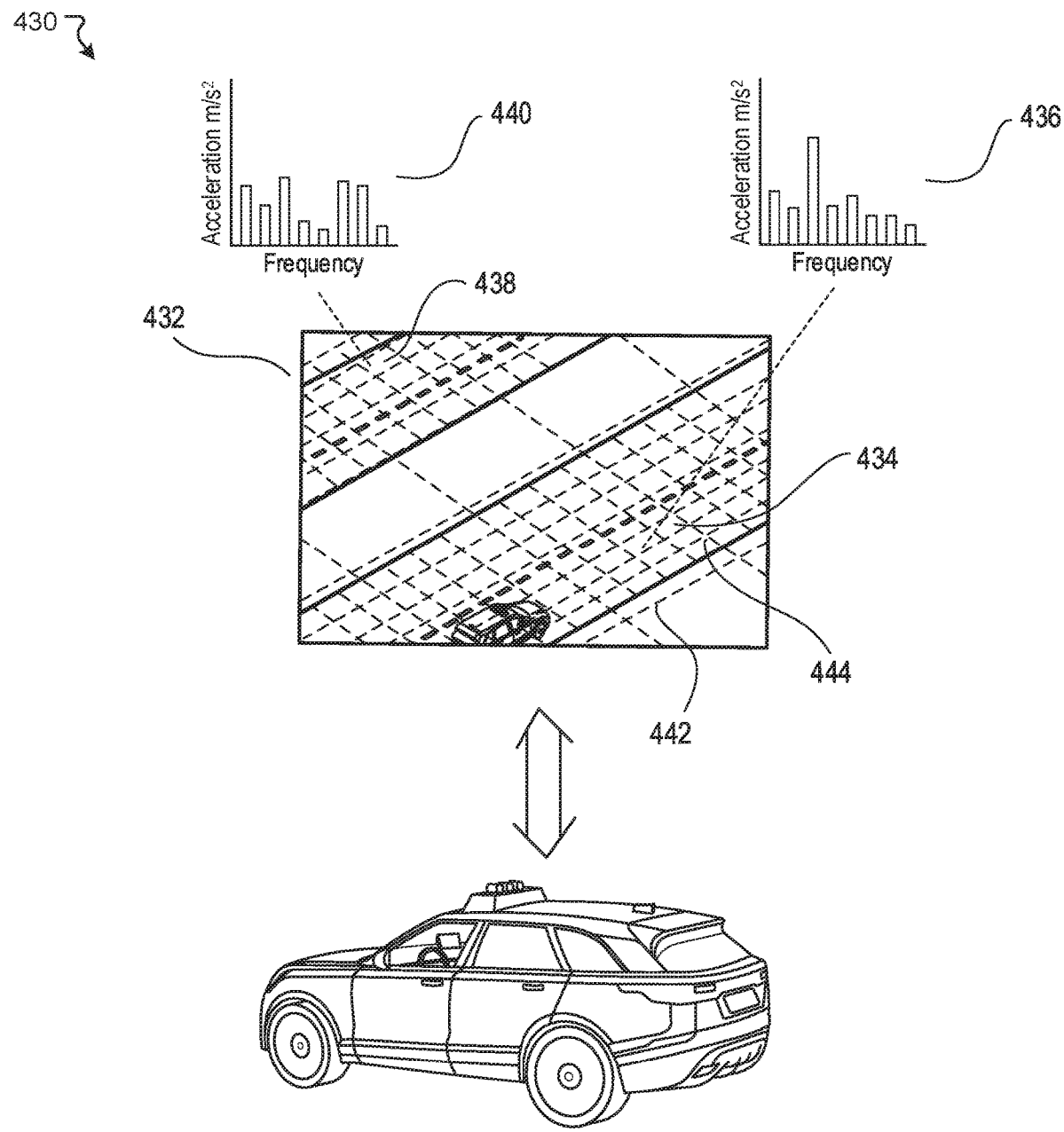
FIG. 4B illustrates an example diagram of an acceleration map, according to an embodiment of the present technology.

FIG. 4B illustrates an example diagram 430 of an acceleration map 432 generated based on functionality of the acceleration map module 312, according to an embodiment of the present technology. The acceleration map 432 can be generated for a geographic region based on acceleration data collected by a fleet of vehicles (e.g., the vehicle 640 as shown in FIG. 6) while navigating the geographic region. In the example shown, the geographic region includes two separated roads, with each road including two lanes separated by a lane divider. The acceleration map 432 can be discretized into a grid of cells. The cells are demarcated by grid lines, such as grid lines 442, 444. In various embodiments, a cell in the grid can be associated with one or more acceleration fingerprints. The acceleration fingerprints for the cell can be determined based on instances of acceleration data that were captured by the fleet of vehicles while navigating a geographic location represented by the cell. For example, in FIG. 4B, a cell 434 is associated with an acceleration fingerprint 436. Further, a cell 438 is associated with an acceleration fingerprint 440. For example, the acceleration fingerprints 436, 440 can be represented as histograms that measure acceleration over various frequencies. In some embodiments, cells can be associated with multiple acceleration fingerprints. For example, a cell may be associated with multiple layers of acceleration data that were captured by different acceleration sensors of the fleet of vehicles. In this example, the cell can be associated with multiple acceleration fingerprints that each represent a layer of the acceleration data. Many variations are possible.

Figure 4C:
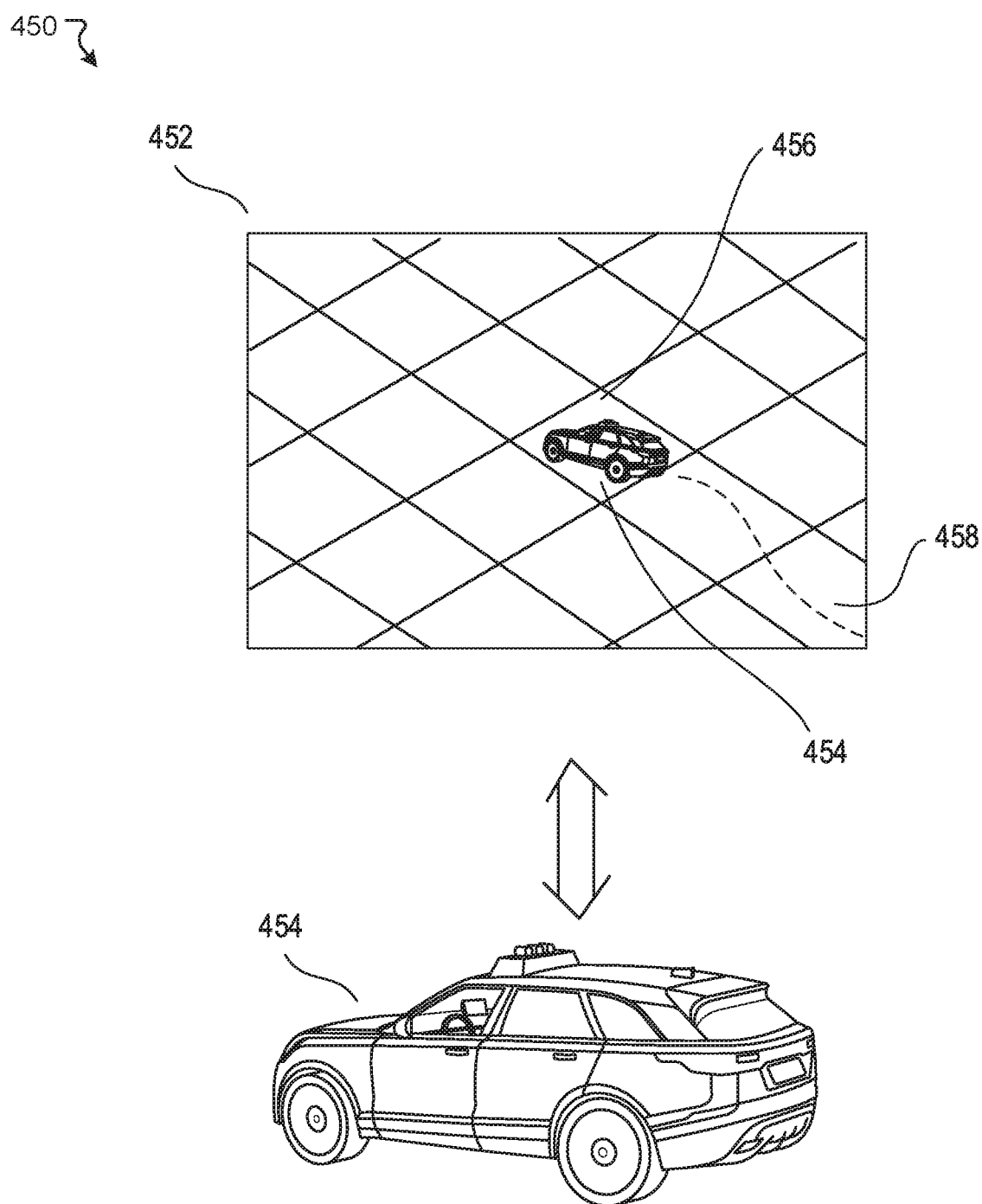
FIG. 4C illustrates an example approach for sensor map-based localization, according to an embodiment of the present technology.

FIG. 4C illustrates an example diagram 450 of localizing a vehicle 454 within a sensor map 452 based on functionality of the vehicle localization module 332, according to an embodiment of the present technology. For example, the sensor map 452 can segment a geographic region into a grid of cells. Some or all of the cells can be associated with sensor fingerprints that can be used to localize the vehicle 454. For example, in some embodiments, the sensor map 452 may be an acoustic map that segments a geographic region into a grid of cells. Some or all of the cells can be associated with acoustic fingerprints that can be used to localize the vehicle 454. For example, the vehicle 454 can be localized within the geographic region based on a threshold correlation between an acoustic measurement captured by audio sensors of the vehicle 454 and an acoustic fingerprint associated with a cell 456, as described above. In various embodiments, the threshold correlation is based on a correspondence between the cell 456 and a trajectory 458 of the vehicle 454. In some embodiments, the sensor map 452 may be an acceleration map that segments the geographic region cells. Some or all of the cells can be associated with acceleration fingerprints that can be used to localize the vehicle 454. For example, the vehicle 454 can be localized within the geographic region based on a threshold correlation between an acceleration measurement captured by acceleration sensors of the vehicle 454 and an acceleration fingerprint associated with a cell 456, as described above. Many variations are possible.

Figure 4D:
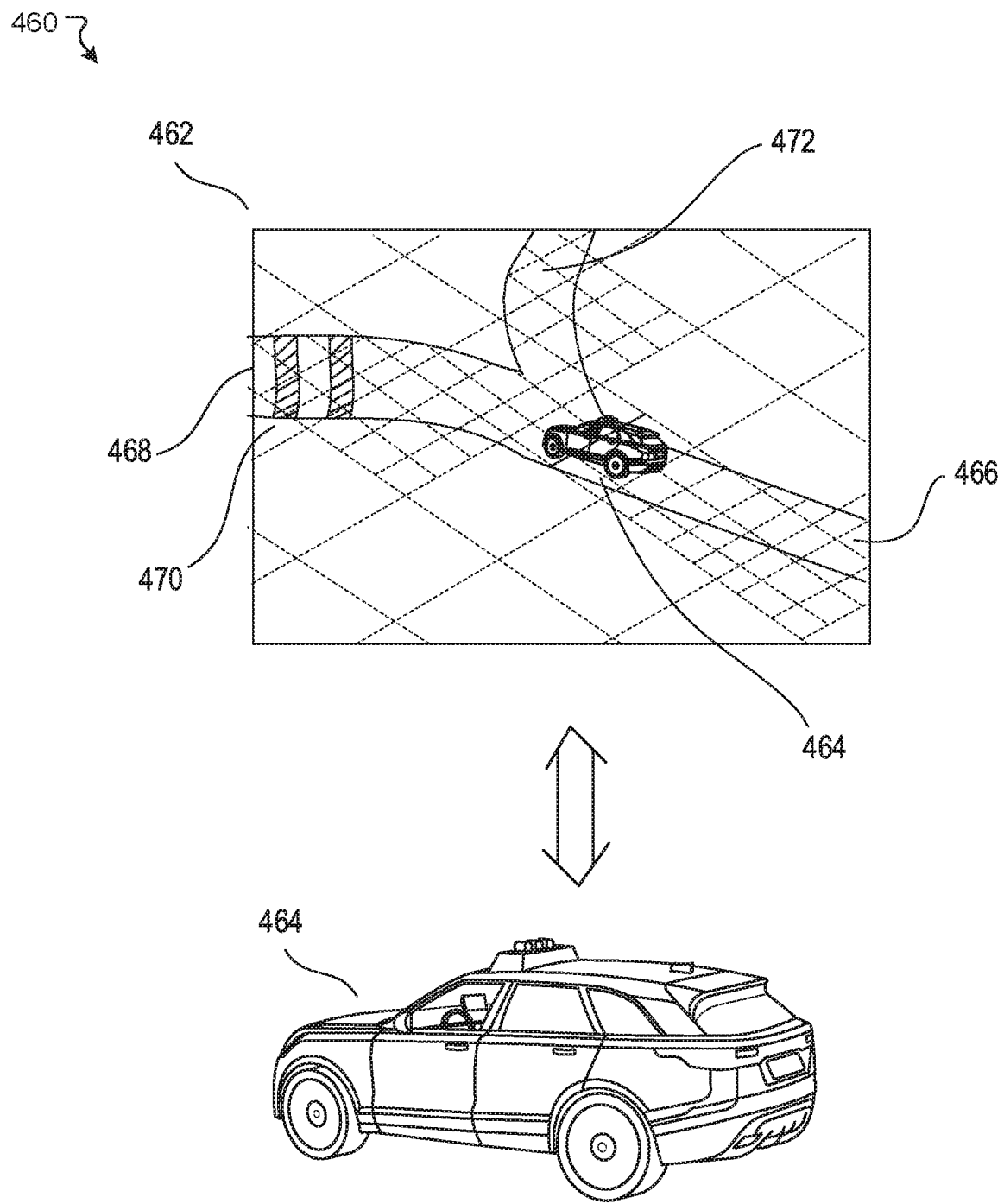
FIG. 4D illustrates an example approach for comfort-based routing based on sensor maps, according to an embodiment of the present technology.

FIG. 4D illustrates an example diagram 460 of routing a vehicle 464 within a sensor map 462 based on functionality of the vehicle routing module 342, according to an embodiment of the present technology. For example, the sensor map 462 can segment a geographic region into a grid of cells. Some or all of the cells can be associated with sensor fingerprints (e.g., acoustic fingerprints, acceleration fingerprints) that can be used to route the vehicle 464. In various embodiments, potential routes available for use by the vehicle 464 can be scored based on a comfort level associated with the potential routes, as described above. In the example of FIG. 4D, the vehicle 464 is shown navigating a road 466 within the geographic region. The vehicle 464 can be routed using a first route 468 or a second route 472. In this example, the first route 468 includes several speed bumps 470 while the second route 472 is a paved road. In various embodiments, respective scores can be determined for the first route 468 and the second route 472 based on sensor fingerprints associated with the cells. These scores can measure a comfort (or discomfort) level that may be experienced by passengers when the vehicle 464 is navigated using the route. In this example, the score for the second route 472 is greater than the score for the first route 468 due to the presence of speed bumps 470 along the first route 468. As a result, the vehicle 464 can be instructed to avoid the first route 468 and use the second route 472 to improve passenger comfort. Many variations are possible.

Figure 4E:
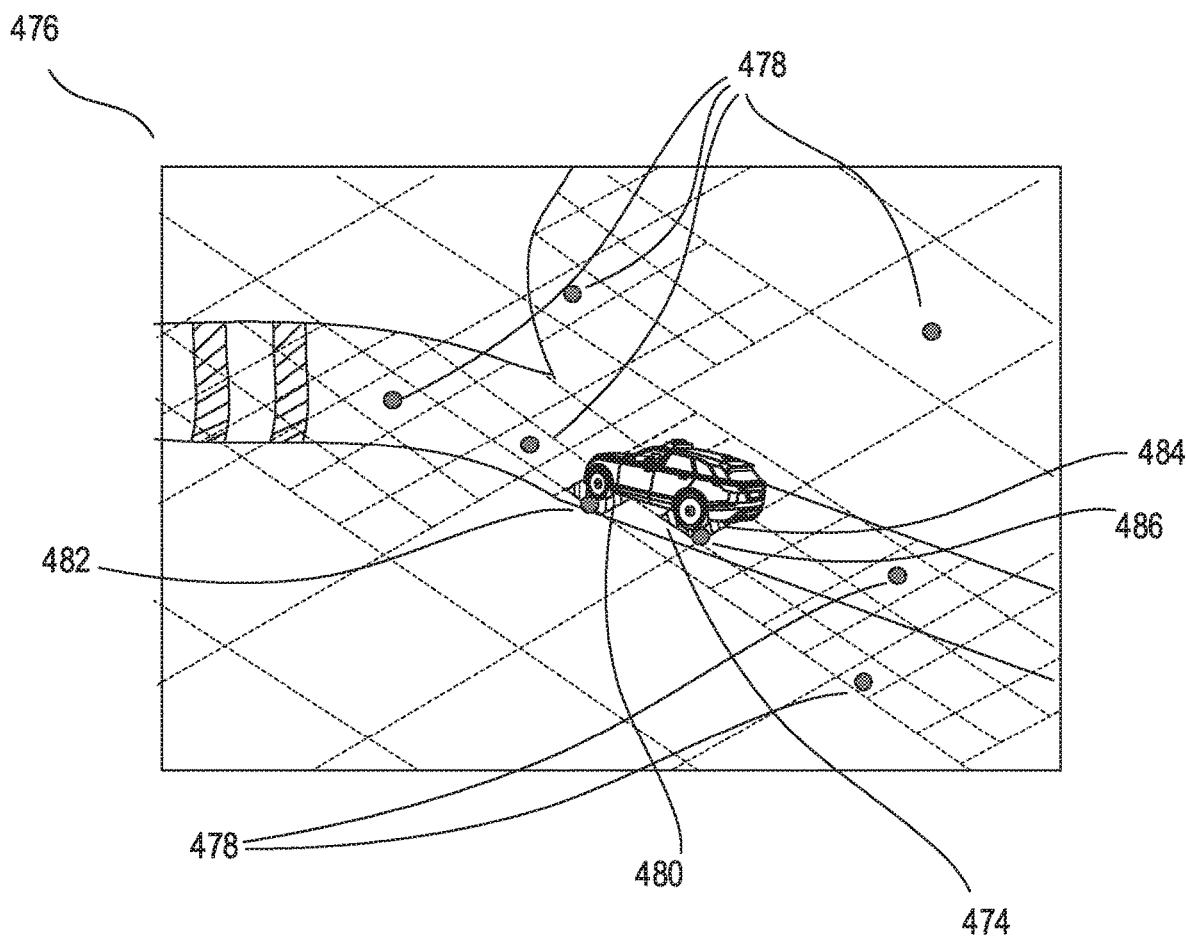
FIGS. 4E-4G illustrate an example approach for localization based on particle filtering, according to an embodiment of the present technology.
Figure 4F:
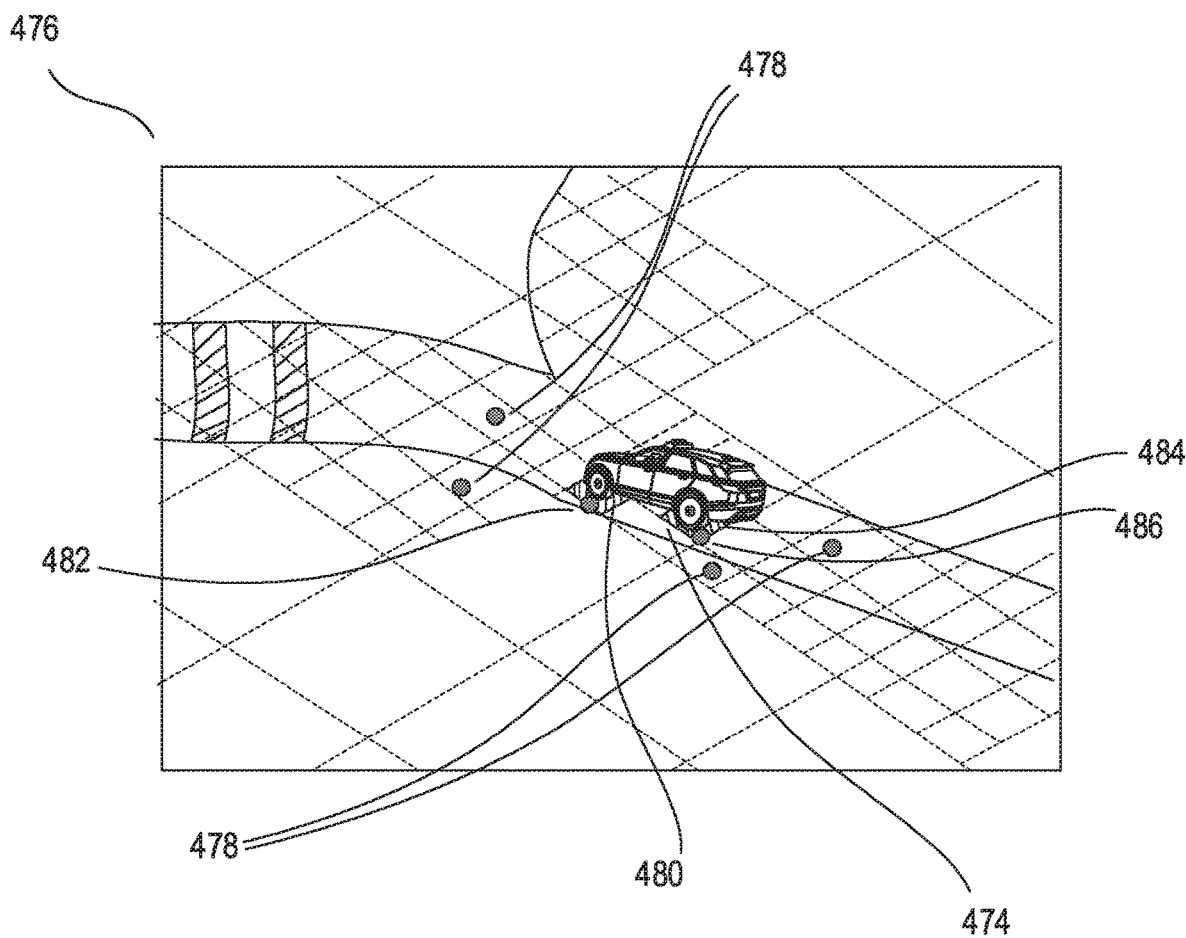
Figure 4G:
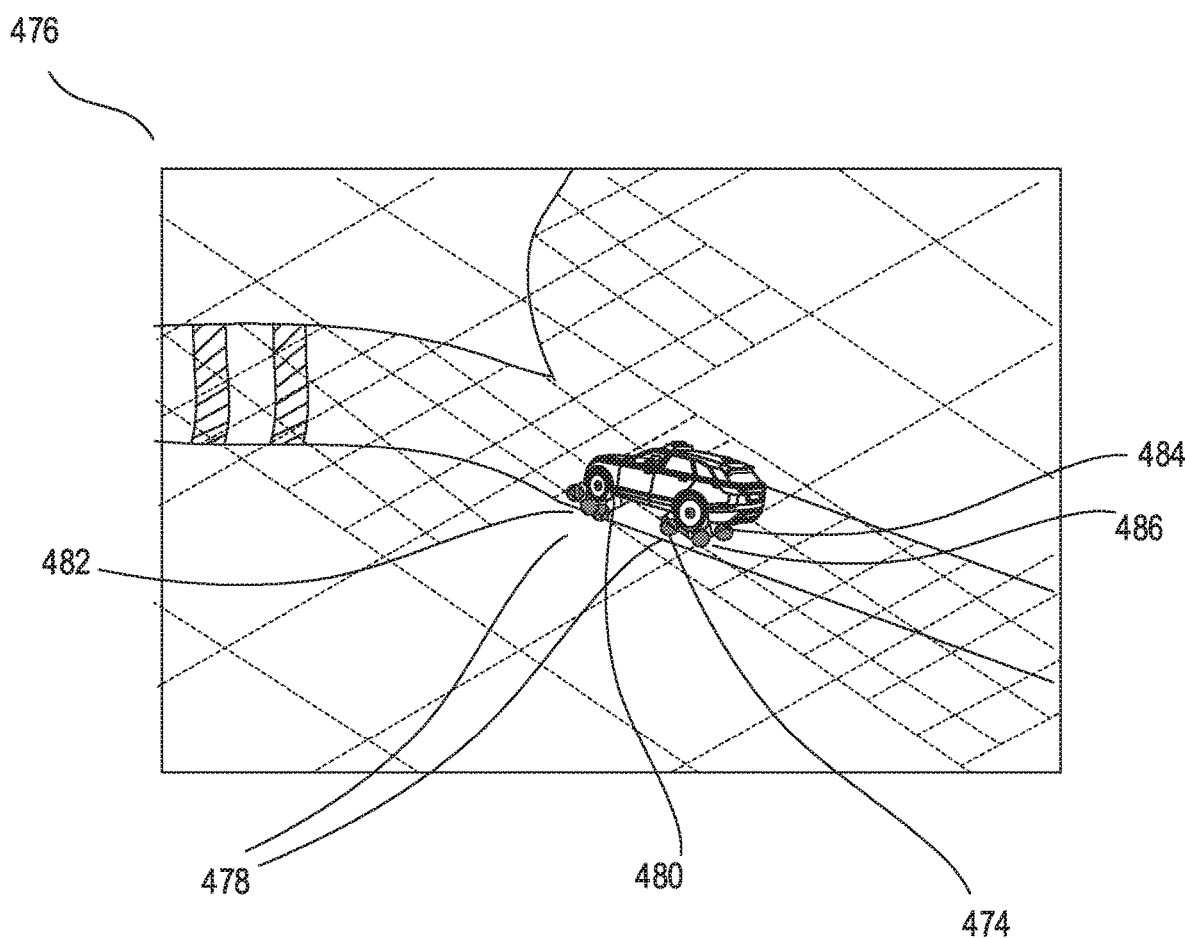

FIG. 4E illustrates an example diagram of routing a vehicle 474 within a sensor map 476 based on functionality of the localization module 340, according to an embodiment of the present technology. For example, the sensor map 476 can segment a geographic region into a grid of cells. Some or all of the cells can be associated with sensor fingerprints (e.g., acoustic fingerprints, acceleration fingerprints) that can be used to localize the vehicle 474. In various embodiments, the vehicle 474 can be localized based on particle filtering. For example, rather than determine a score for each cell in the grid, a set of uniformly weighted particles 478 can randomly be initialized in various cells in the grid. A score measuring a correlation between a captured sensor measurement and a sensor fingerprint associated with a cell in which a particle is initialized can be determined for each of the particles, as described above. For example, a sensor measurement captured by sensors positioned at or near a front-left wheel of the vehicle 474 can evaluated with respect to a sensor fingerprint associated with a cell 480 in which a particle 482 was initialized. In some embodiments, a weight assigned to the particle 482 increases when a threshold amount of correlation exists between the sensor measurement and the sensor fingerprint associated with the cell 480 in which the particle 482 was initialized. Similarly, a sensor measurement captured by sensors positioned at or near a rear-left wheel of the vehicle 474 can evaluated with respect to a sensor fingerprint associated with a cell 484 in which a particle 486 was initialized. In some embodiments, a weight assigned to the particle 486 increases when a threshold amount of correlation exists between the sensor measurement and the sensor fingerprint associated with the cell 484 in which the particle 486 was initialized. In some embodiments, particles with low correlation scores can be discarded and the remaining particles can be re-initialized around particles 482, 486 with the best correlation scores, as illustrated in FIG. 4F. In this example, the particles 478 can iteratively be discarded and re-initialized until the particles 478 converge within the cells 480, 484, as illustrated in the example of FIG. 4G. The cells 480, 484 within which the particles converge can be identified as cells within which some portion of the vehicle is located.

Figure 5A:
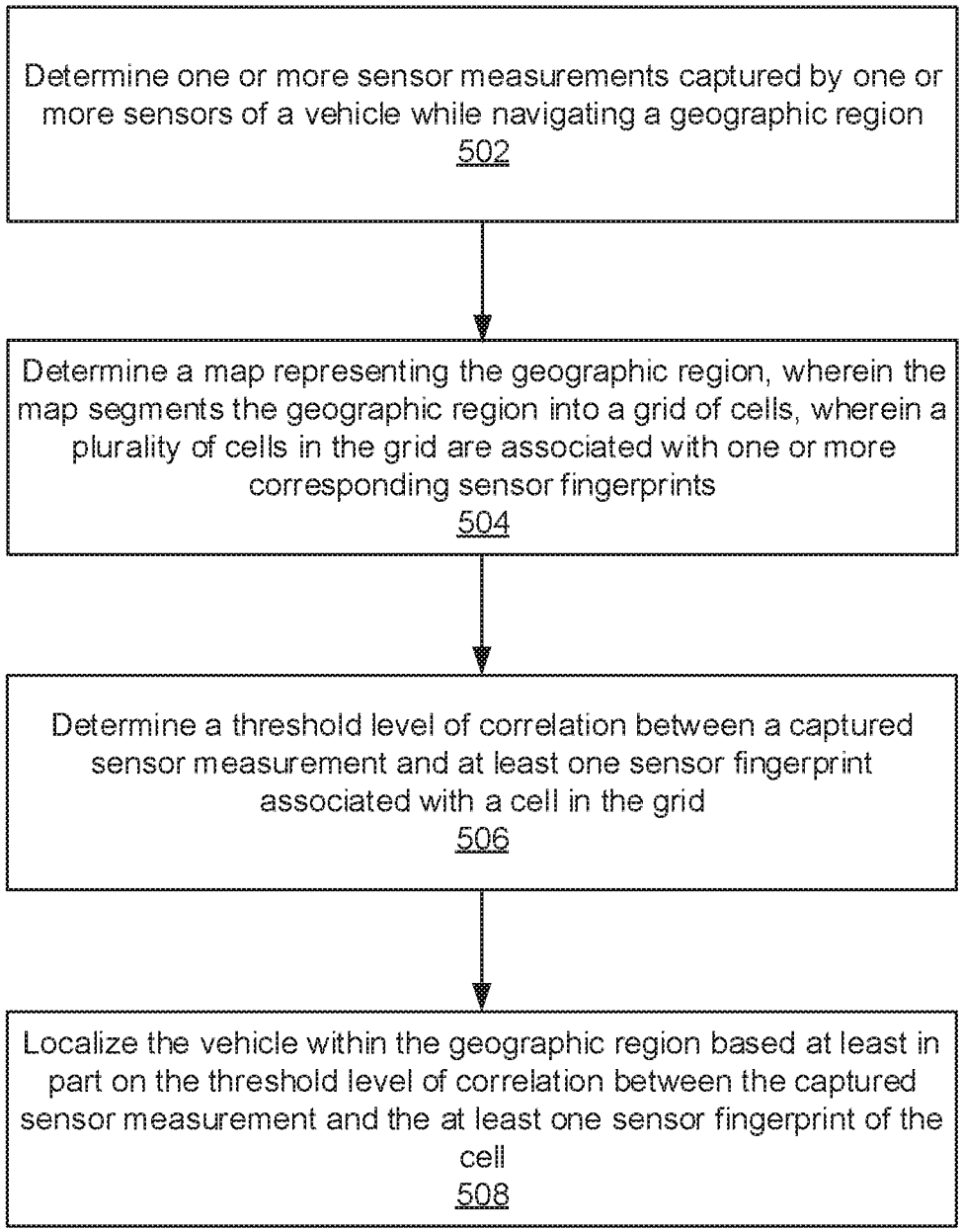

FIG. 5A illustrates an example method 500 based on functionality of the vehicle localization module 332, according to an embodiment of the present technology. At block 502, one or more sensor measurements captured by one or more sensors of a vehicle while navigating a geographic region can be determined. At block 504, a sensor map representing the geographic region can be determined. The map can segment the geographic region into a grid of cells. A plurality of cells in the grid can be associated with one or more corresponding sensor fingerprints. At block 506, a threshold level of correlation can be determined between a captured sensor measurement and at least one sensor fingerprint associated with a cell in the grid. At block 508, the vehicle can be localized within the geographic region based at least in part on the threshold level of correlation between the captured sensor measurement and the at least one sensor fingerprint of the cell. Many variations to the example method are possible. It should be appreciated that there can be additional, fewer, or alternative steps performed in similar or alternative orders, or in parallel, within the scope of the various embodiments discussed herein unless otherwise stated.

FIG. 5B illustrates an example method 520 based on functionality of the multi-dimensional mapping module 202, according to an embodiment of the present technology. At block 522, sensor data collected by a fleet of vehicles while navigating a geographic region can be determined. At block 524, a sensor map representing the geographic region can be determined. The map can segment the geographic region into a grid of cells. At block 526, instances of the collected sensor data can be associated with cells in the grid of cells. At block 528, a corresponding fingerprint can be determined for one or more cells in the grid of cells based at least in part on a plurality of instances of sensor data associated with the cell. Many variations to the example method are possible. It should be appreciated that there can be additional, fewer, or alternative steps performed in similar or alternative orders, or in parallel, within the scope of the various embodiments discussed herein unless otherwise stated.

FIG. 5C illustrates an example method 530 based on functionality of the vehicle routing module 342, according to an embodiment of the present technology. At block 532, at least one potential route for navigating a vehicle within a geographic region can be determined. At block 534, a score that measures a comfort level associated with the potential route can be determined, wherein the score is determined based on at least one sensor map of the geographic region. At block 536, a determination is made whether to use the potential route for navigating the vehicle based at least in part on the score. Many variations to the example method are possible. It should be appreciated that there can be additional, fewer, or alternative steps performed in similar or alternative orders, or in parallel, within the scope of the various embodiments discussed herein unless otherwise stated.

FIG. 6 illustrates an example block diagram of a transportation management environment for matching ride requestors with vehicles. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all modules of the multi-dimensional mapping module 202 may be implemented by one or more computing systems of the transportation management system 660. In some embodiments, some or all modules of the multi-dimensional mapping module 202 may be implemented by one or more computing systems in the vehicle 640.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, Calif., the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2 G/3 G/4 G/LTE mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news) ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6, sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6, navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
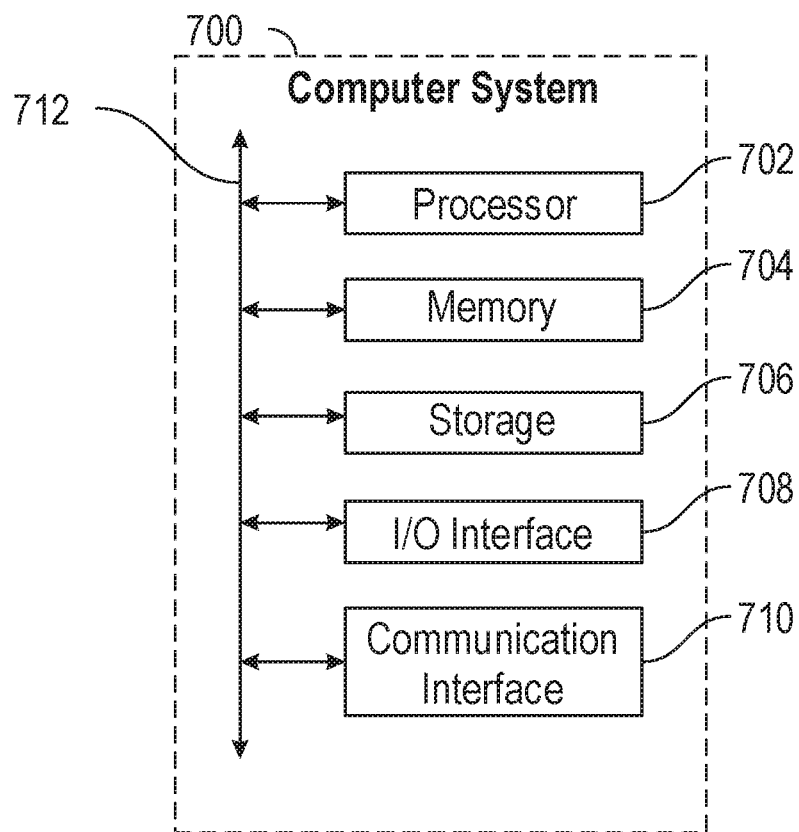
FIG. 7 illustrates an example of a computer system or computing device that can be utilized in various scenarios, according to an embodiment of the present technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
   determining, by a computing system, at least one potential route for navigating a vehicle within a geographic region, wherein the at least one potential route includes at least one trajectory of at least one wheel of the vehicle;
   determining, by the computing system, a route score that measures a comfort level associated with the potential route based on at least one sensor map that segments the geographic region into a grid of cells and that includes an acoustic map of acoustic fingerprints that reflect acoustic properties associated with the grid of cells of the geographic region, wherein the determining the route score comprises:
  determining, by the computing system, a set of cells of the grid of cells through which the trajectory of the at least one wheel travels for the potential route;
  providing, by the computing system, an acoustic fingerprint corresponding to a first cell in the set of cells to a first machine learning model;
  obtaining, by the computing system, a cell score measuring a comfort level associated with the first cell; and
  determining, by the computing system, the route score based on the cell score; and
determining, by the computing system, whether to use the potential route for navigating the vehicle based at least in part on the route score.

2. The computer-implemented method of claim 1, wherein the acoustic map segments the geographic region based on the grid of cells.

3. The computer-implemented method of claim 2, wherein determining the route score further comprises:
  determining, by the computing system, the set of cells in the acoustic map that represent the potential route;
  determining, by the computing system, respective acoustic fingerprints for the set of cells; and
  determining, by the computing system, the route score measuring the comfort level for the potential route based at least in part on acoustic properties reflected in the acoustic fingerprints.

4. The computer-implemented method of claim 3, wherein the first machine learning model is trained to score routes based on acoustic properties.

5. The computer-implemented method of claim 4, wherein the first machine learning model is trained to recognize at least one of: a speed bump, an unpaved section, a pothole, debris, a bumpy road segment, a stop sign, a traffic control device, designated crosswalks, and textured crosswalks.

6. The computer-implemented method of claim 1, wherein the first cell is associated with layers of acoustic data captured by audio sensors of a fleet of vehicles.

7. The computer-implemented method of claim 1, wherein the at least one sensor map is an acceleration map of the geographic region that measures accelerative properties associated with the geographic region, wherein the acceleration map segments the geographic region based on the grid of cells.

8. The computer-implemented method of claim 7, wherein determining the route score further comprises:
  determining, by the computing system, the set of cells in the acceleration map that represent the potential route;
  determining, by the computing system, respective acceleration fingerprints for the set of cells; and
  determining, by the computing system, the route score measuring the comfort level for the potential route based at least in part on accelerative properties reflected in the acceleration fingerprints.

9. The computer-implemented method of claim 8, wherein the route score is determined based at least in part on a second machine learning model that is trained to score routes based on accelerative properties.

10. The computer-implemented method of claim 1, further comprising:
  determining, by the computing system, a respective score that measures a comfort level associated with a first lane and a second lane in the potential route, wherein the score is determined based on the at least one sensor map of the geographic region; and
  determining, by the computing system, whether to avoid the first lane or the second lane based at least in part on the scores.

11. A system comprising:
  at least one processor; and
  a memory storing instructions that, when executed by the at least one processor, cause the system to perform:
    determining at least one potential route for navigating a vehicle within a geographic region, wherein the at least one potential route includes at least one trajectory of at least one wheel of the vehicle;
    determining a route score that measures a comfort level associated with the potential route based on at least one sensor map that segments the geographic region into a grid of cells and that includes an acoustic map of acoustic fingerprints that reflect acoustic properties associated with the grid of cells of the geographic region, wherein the determining the route score comprises:
      determining a set of cells of the grid of cells through which the trajectory of the at least one wheel travels for the potential route;
      providing an acoustic fingerprint corresponding to a first cell in the set of cells to a first machine learning model;
      obtaining a cell score measuring a comfort level associated with the first cell; and
      determining the route score based on the cell score; and
    determining whether to use the potential route for navigating the vehicle based at least in part on the route score.

12. The system of claim 11, wherein the acoustic map segments the geographic region based on the grid of cells.

13. The system of claim 12, wherein determining the route score further causes the system to perform:
  determining the set of cells in the acoustic map that represent the potential route;
  determining respective acoustic fingerprints for the set of cells; and
  determining the route score measuring the comfort level for the potential route based at least in part on acoustic properties reflected in the acoustic fingerprints.

14. The system of claim 13, wherein the first machine learning model is trained to score routes based on acoustic properties.

15. The system of claim 11, wherein the first cell is associated with layers of acoustic data captured by audio sensors of a fleet of vehicles.

16. A non-transitory computer-readable storage medium including instructions that, when executed by at least one processor of a computing system, cause the computing system to perform a method comprising:
  determining at least one potential route for navigating a vehicle within a geographic region, wherein the at least one potential route includes at least one trajectory of at least one wheel of the vehicle;
  determining a route score that measures a comfort level associated with the potential route based on at least one sensor map that segments the geographic region into a grid of cells and that includes an acoustic map of acoustic fingerprints that reflect acoustic properties associated with the grid of cells of the geographic region, wherein the determining the route score comprises:
- determining a set of cells of the grid of cells through which the trajectory of the at least one wheel travels for the potential route;
- providing an acoustic fingerprint corresponding to a first cell in the set of cells to a first machine learning model;
- obtaining a cell score measuring a comfort level associated with the first cell; and
- determining the route score based on the cell score; and determining whether to use the potential route for navigating the vehicle based at least in part on the route score.

17. The non-transitory computer-readable storage medium of claim 16, wherein the acoustic map segments the geographic region based on the grid of cells.

18. The non-transitory computer-readable storage medium of claim 17, wherein determining the route score further causes the computing system to perform:
- determining the set of cells in the acoustic map that represent the potential route;
- determining respective acoustic fingerprints for the set of cells; and
- determining the route score measuring the comfort level for the potential route based at least in part on acoustic properties reflected in the acoustic fingerprints.

19. The non-transitory computer-readable storage medium of claim 18, wherein the first machine learning model is trained to score routes based on acoustic properties.

20. The non-transitory computer-readable storage medium of claim 16, wherein the first cell is associated with layers of acoustic data captured by audio sensors of a fleet of vehicles.

\* \* \* \* \*